United States Patent
Lin et al.

(10) Patent No.: US 10,200,952 B2
(45) Date of Patent: Feb. 5, 2019

(54) WIRELESS ACCESS POINT CONTROL METHOD, RELATED DEVICE, AND SYSTEM

(71) Applicant: Huawei Technologies Co., Ltd., Shenzhen (CN)

(72) Inventors: Bo Lin, Beijing (CN); Li Chai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 559 days.

(21) Appl. No.: 14/821,255

(22) Filed: Aug. 7, 2015

(65) Prior Publication Data

US 2015/0351034 A1    Dec. 3, 2015

Related U.S. Application Data

(63) Continuation of application No. PCT/CN2013/071562, filed on Feb. 8, 2013.

(51) Int. Cl.
*H04W 52/02* (2009.01)

(52) U.S. Cl.
CPC ... *H04W 52/0235* (2013.01); *H04W 52/0206* (2013.01); *Y02D 70/24* (2018.01); *Y02D 70/25* (2018.01)

(58) Field of Classification Search
None
See application file for complete search history.

(56) References Cited

U.S. PATENT DOCUMENTS

| | | | | |
|---|---|---|---|---|
| 7,333,785 B1* | 2/2008 | Lavelle | ............... | H04W 52/028 455/127.5 |
| 8,548,479 B2* | 10/2013 | Kim | ................. | H04W 36/0055 370/331 |
| 8,676,220 B2* | 3/2014 | Kim | ................. | H04W 52/0241 370/311 |
| 8,725,183 B2* | 5/2014 | Kim | ................. | H04W 52/0206 455/422.1 |

(Continued)

FOREIGN PATENT DOCUMENTS

| CN | 101340307 A | 1/2009 |
|---|---|---|
| CN | 102083182 A | 6/2011 |

(Continued)

*Primary Examiner* — Ayaz R Sheikh
*Assistant Examiner* — Tarell A Hampton
(74) *Attorney, Agent, or Firm* — Slater Matsil, LLP

(57) ABSTRACT

The present invention provides a wireless access point control method, a related device, and a system. An activation signal sent by user equipment is received on a radio resource corresponding to a receiving pattern of a first wireless access point, so that the first wireless access point controls itself to leave a power-saving state according to the activation signal. Therefore, the user equipment may directly send the activation signal to the first wireless access point to switch a working state of the first wireless access point from the power-saving state to a normal communication state as soon as possible. In this manner, a power-saving objective of the wireless access point is achieved, and switching of the wireless access point from the power-saving state to the normal communication state as soon as possible can also be accelerated on a basis of achieving power saving of the wireless access point.

26 Claims, 15 Drawing Sheets

(56) References Cited

U.S. PATENT DOCUMENTS

| | | | | |
|---|---|---|---|---|
| 8,824,322 B2* | 9/2014 | Osterling | .......... | H04W 52/0225 370/252 |
| 9,049,689 B2* | 6/2015 | Osterling | ............ | H04W 74/006 |
| 9,301,225 B2* | 3/2016 | Comsa | .............. | H04W 36/0094 |
| 9,521,613 B2* | 12/2016 | Yomo | ............... | H04W 52/0206 |
| 9,648,561 B2* | 5/2017 | Ruster | ............... | H04W 52/0206 |
| 2007/0053316 A1* | 3/2007 | Wiatrowski | .......... | H04W 16/14 370/321 |
| 2007/0066329 A1* | 3/2007 | Laroia | ................. | H04B 7/2678 455/502 |
| 2009/0005127 A1* | 1/2009 | Frenger | ................. | H04W 52/28 455/574 |
| 2009/0290561 A1* | 11/2009 | Kleindl | ............... | H04W 52/028 370/338 |
| 2010/0002610 A1* | 1/2010 | Bowser | ................ | G06F 1/3203 370/311 |
| 2010/0002614 A1* | 1/2010 | Subrahmanya | ..... | H04W 52/244 370/311 |
| 2010/0056184 A1* | 3/2010 | Vakil | ....................... | H04W 4/02 455/456.5 |
| 2010/0110979 A1* | 5/2010 | Chen | ................. | H04W 52/0225 370/328 |
| 2011/0151867 A1* | 6/2011 | Hirano | ................. | H04W 8/183 455/434 |
| 2011/0182213 A1* | 7/2011 | Forssell | ............ | H04W 52/0235 370/277 |
| 2012/0008512 A1* | 1/2012 | Wahlqvist | ......... | H04W 52/0232 370/252 |
| 2012/0015649 A1* | 1/2012 | Li | ..................... | H04W 36/0061 455/434 |
| 2012/0236977 A1* | 9/2012 | Zou | .................. | H04W 56/0015 375/354 |
| 2012/0300686 A1* | 11/2012 | Maeda | ............. | H04W 52/0206 370/311 |
| 2013/0189932 A1 | 7/2013 | Shen et al. | | |
| 2013/0288658 A1* | 10/2013 | Duan | ............. | H04W 52/0206 455/418 |
| 2014/0003312 A1* | 1/2014 | Sergeyev | ............. | H04W 28/08 370/311 |

FOREIGN PATENT DOCUMENTS

| | | |
|---|---|---|
| CN | 102104939 A | 6/2011 |
| CN | 102421172 A | 4/2012 |
| CN | 102742330 A | 10/2012 |
| WO | 2005050426 A1 | 6/2005 |

* cited by examiner

WIRELESS ACCESS POINT CONTROL METHOD, RELATED DEVICE, AND SYSTEM

This application is a continuation of International Application No. PCT/CN2013/071562, filed on Feb. 8, 2013, which is hereby incorporated by reference in its entirety.

TECHNICAL FIELD

The present invention relates to the field of communications technologies, and in particular, to a wireless access point control method, a related device, and a system.

BACKGROUND

In a communications network, to increase a throughput of the network, a micro base station is generally introduced in a macro cell, and therefore a micro cell is formed on a basis of the macro cell. When user equipment (User Equipment, UE) is migrated to the micro cell, the macro cell may hand over services of the UE to the micro cell, and the base station provides services for the UE, thereby achieving objectives of offloading traffic of the UE and increasing the throughput of the network.

In an actual application, to ensure that the services of the UE are handed over to the micro cell in time, it is required that the micro cell should always be in an enabled state. However, coverage of the micro cell is generally small, which cannot ensure that UE in an activated state always exists within the coverage of the micro cell. When no UE in the activated state exists, the objective of offloading traffic cannot be achieved. Instead, large power consumption of the base station is caused because the micro cell is always in the enabled state.

SUMMARY

In view of the problem that coverage of an existing base station is small and that large power consumption is caused because the base station is always in an activated state, the present invention provides a wireless access point control method, a related device, and a system.

According to a first aspect, an embodiment provides a wireless access point control method, including:

entering, by a first wireless access point, a power-saving state, where the power-saving state includes at least a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point;

receiving, by the first wireless access point, on the radio resource corresponding to the receiving pattern, an activation signal sent by user equipment; and leaving, by the first wireless access point, the power-saving state according to the activation signal.

With reference to the first aspect, in a first possible implementation manner, before the receiving, by the first wireless access point, on the radio resource indicated by the receiving pattern, an activation signal sent by user equipment, the method further includes:

sending, by the first wireless access point, state information to a second wireless access point, so that the second wireless access point sends the state information to the user equipment served by the second wireless access point, where the state information is used to indicate the radio resource corresponding to the receiving pattern.

With reference to the first aspect or the first possible implementation manner of the first aspect, in a second possible implementation manner, the radio resource corresponding to the receiving pattern is one or a combination of the following:

some frequencies in all frequencies supported by the first wireless access point;
some subframes in all subframes; and
some code resources in all code resources supported by the first wireless access point.

With reference to the first aspect, in a third possible implementation manner, the power-saving state further includes a power-saving transmitting state, where the power-saving transmitting state is that the first wireless access point sends a signal on a radio resource corresponding to a sending pattern, and the radio resource corresponding to the sending pattern is a part of all radio resources supported by the first wireless access point; and before the receiving, by the first wireless access point, on the radio resource corresponding to the receiving pattern, an activation signal sent by user equipment, the method further includes:

sending, by the first wireless access point, a wireless access point identity on the radio resource corresponding to the sending pattern, where the wireless access point identity is used to identify the first wireless access point.

With reference to the third possible implementation manner of the first aspect, in a fourth possible implementation manner, the wireless access point identity is at least one of a physical cell identity, a physical cell group identity, a sounding reference signal, a synchronization signal, and a channel status indication reference signal.

With reference to the third possible implementation manner or the fourth possible implementation manner of the first aspect, in a fifth possible implementation manner, the radio resource corresponding to the transmitting pattern is one or a combination of the following:

some frequencies in all frequencies supported by the first wireless access point;
some subframes in all subframes; and
some code resources in all code resources supported by the first wireless access point.

With reference to any one possible implementation manner of the third possible implementation manner to the fifth possible implementation manner of the first aspect, in a sixth possible implementation manner, before the sending, by the first wireless access point, a wireless access point identity on the radio resource corresponding to the sending pattern, the method further includes:

sending, by the first wireless access point, state information to a second wireless access point, so that the second wireless access point sends the state information to the user equipment served by the second wireless access point, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

With reference to any one possible implementation manner of the third possible implementation manner to the sixth possible implementation manner of the first aspect, in a seventh possible implementation manner, the sending pattern and/or the receiving pattern is prestored, or the sending pattern and/or the receiving pattern is configured by the second wireless access point, or the sending pattern and/or the receiving pattern is acquired from a network management device.

With reference to any one possible implementation manner of the first possible implementation manner to the sixth possible implementation manner of the first aspect, in an eighth possible implementation manner, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

With reference to the first aspect or any one of the first possible implementation manner to the seventh possible implementation manner of the first aspect, in a ninth possible implementation manner, after the leaving, by the first wireless access point, the power-saving state, the method further includes:

sending, by the first wireless access point, a notification indicating that the first wireless access point leaves the power-saving state, to the second wireless access point; or sending, by the first wireless access point, a notification indicating that the first wireless access point leaves the power-saving state, to the user equipment, where the notification indicating that the first wireless access point leaves the power-saving state includes at least one notification of a notification indicating that the first wireless access point leaves the power-saving receiving state or a notification indicating that the first wireless access point leaves the power-saving transmitting state.

According to a second aspect, an embodiment of the present invention provides a wireless access point control method, including:

determining, by user equipment, a receiving pattern that is used when a first wireless access point receives a signal in a power-saving state, where the power-saving state includes at least a power-saving receiving state, where the power-saving receiving state is that the first wireless access point receives the signal on a radio resource corresponding to the receiving pattern, and the radio resource corresponding to the receiving pattern is a part of all radio resources supported by the first wireless access point; and sending, by the user equipment, an activation signal on the radio resource corresponding to the receiving pattern, where the activation signal is used to instruct the first wireless access point to leave the power-saving state.

With reference to the second aspect, in a first possible implementation manner, the determining, by user equipment, a receiving pattern that is used when a first wireless access point receives a signal in a power-saving state, includes:

receiving configuration information sent by a second wireless access point, where the configuration information includes state information used to indicate the receiving pattern of the first wireless access point; and determining the receiving pattern of the first wireless access point according to the configuration information.

With reference to the first possible implementation manner of the second aspect, in a second possible implementation manner, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

With reference to the second aspect or the first possible implementation manner of the second aspect or the second possible implementation manner of the second aspect, in a third possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the second aspect, in a fourth possible implementation manner, the determining, by user equipment, a receiving pattern that is used when a first wireless access point receives a signal in a power-saving state, includes:

receiving, by the user equipment, a wireless access point identity that is sent by the first wireless access point in a power-saving transmitting state included by the power-saving state, where the wireless access point identity is used to identify the first wireless access point, the power-saving transmitting state is that the first wireless access point sends a signal on a radio resource corresponding to a sending pattern, and the radio resource corresponding to the sending pattern is a part of all radio resources supported by the first wireless access point; and determining, by the user equipment according to the wireless access point identity, the receiving pattern that is used when the first wireless access point receives the signal in the power-saving state.

With reference to the fourth possible implementation manner of the second aspect, in a fifth possible implementation manner, before the receiving, by the user equipment, a wireless access point identity, the method further includes:

receiving, by the user equipment, configuration information sent by a second wireless access point, where the configuration information includes state information used to indicate the sending pattern of the first wireless access point; and the receiving, by the user equipment, a wireless access point identity that is sent by the first wireless access point in a power-saving transmitting state included by the power-saving state, includes:

receiving, by the user equipment according to the transmitting pattern, the wireless access point identity that is sent by the first wireless access point in the power-saving transmitting state included by the power-saving state.

With reference to the fifth possible implementation manner of the second aspect, in a sixth possible implementation manner, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

With reference to any one possible implementation manner of the fourth possible implementation manner to the sixth possible implementation manner of the second aspect, in a seventh possible implementation manner, the determining, by the user equipment according to the wireless access point identity, the receiving pattern that is used when the first wireless access point receives the signal in the power-saving state, includes:

obtaining, by the user equipment according to a time point of receiving the wireless access point identity, and a correspondence between the sending pattern and the receiving pattern of the first wireless access point, a time point of sending the activation signal; and the sending, by the user equipment, an activation signal on the radio resource corresponding to the receiving pattern, includes:

sending, by the user equipment, the activation signal at the time point of sending the activation signal, where the correspondence between the sending pattern and the receiving pattern is prestored or is notified by the second wireless access point.

With reference to any one possible implementation manner of the fourth possible implementation manner to the seventh possible implementation manner of the second aspect, in an eighth possible implementation manner, the wireless access point identity is at least one of a physical cell identity, a physical cell group identity, a sounding reference signal, a synchronization signal, and a channel status indication reference signal.

With reference to any one possible implementation manner of the first possible implementation manner to the seventh possible implementation manner of the second aspect, in a ninth possible implementation manner, the configuration information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

With reference to the second aspect, in a tenth possible implementation manner, after the sending, by the user equipment, an activation signal on the radio resource corresponding to the receiving pattern, the method further includes:

receiving a notification that is sent by the first wireless access point and indicates that the first wireless access point leaves the power-saving state, where the notification indicating that the first wireless access point leaves the power-saving state includes at least one notification of a notification indicating that the first wireless access point leaves the power-saving receiving state or a notification indicating that the first wireless access point leaves the power-saving transmitting state.

According to a third aspect, an embodiment of the present invention provides a wireless access point control method, including:

acquiring state information of a first wireless access point, where the state information is used to indicate a radio resource corresponding to a receiving pattern; and sending the state information of the first wireless access point to user equipment, so that the first wireless access point receives, on the radio resource corresponding to the receiving pattern, an activation signal that is sent by the user equipment according to the state information, and leaves a power-saving state according to the activation signal, where the power-saving state includes a power-saving receiving state, where the power-saving receiving state is that the first wireless access point receives a signal on the radio resource corresponding to the receiving pattern, and the radio resource corresponding to the receiving pattern is a part of all radio resources supported by the first wireless access point.

With reference to the third aspect, in a first possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the first possible implementation manner of the third aspect, in a second possible implementation manner, the state information further includes a wireless access point identity of the first wireless access point, where the wireless access point identity is used to identify the first wireless access point.

With reference to the second possible implementation manner of the third aspect, in a third possible implementation manner, the wireless access point identity is at least one of a physical cell identity, a physical cell group identity, a sounding reference signal, a synchronization signal, and a channel status indication reference signal.

With reference to the third aspect or the first possible implementation manner of the third aspect, in a fourth possible implementation manner, the state information further includes indication information, where the indication information is used to indicate that the first wireless access point is in one of the following states:

the first wireless access point is in the power-saving receiving state;

the first wireless access point is in a power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

According to a fourth aspect, an embodiment of the present invention provides a wireless access point control method, including:

acquiring state information of a first wireless access point; and sending the state information of the first wireless access point to user equipment, so that the first wireless access point sends a wireless access point identity on a radio resource corresponding to a sending pattern, so that the user equipment sends an activation signal to the first wireless access point identified by the wireless access point identity, so that the first wireless access point receives, on a radio resource corresponding to a receiving pattern, the activation signal sent by the user equipment, and leaves a power-saving state according to the activation signal, where the wireless access point identity is used to identify the first wireless access point, and the power-saving state includes a power-saving receiving state and a power-saving transmitting state, where the power-saving receiving state is that the first wireless access point receives a signal on the radio resource corresponding to the receiving pattern, the radio resource corresponding to the receiving pattern is a part of all radio resources supported by the first wireless access point, the power-saving transmitting state is that the first wireless access point sends a signal on the radio resource corresponding to the sending pattern, the radio resource corresponding to the sending pattern is a part of all radio resources supported by the first wireless access point, and the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

With reference to the fourth aspect, in a first possible implementation manner, the wireless access point identity is at least one of a physical cell identity, a physical cell group identity, a sounding reference signal, a synchronization signal, and a channel status indication reference signal.

With reference to the first possible implementation manner of the fourth aspect, in a second possible implementation manner, the radio resource corresponding to the transmitting pattern is one or a combination of the following:

some frequencies in all frequencies supported by the first wireless access point;

some subframes in all subframes; and some code resources in all code resources supported by the first wireless access point.

With reference to the fourth aspect or the first possible implementation manner or the second possible implementation manner of the fourth aspect, in a third possible implementation manner, the sending pattern and/or the receiving pattern is prestored, or the sending pattern and/or the receiving pattern is configured by a second wireless access point, or the sending pattern and/or the receiving pattern is acquired from a network management device.

With reference to the fourth aspect, in a fourth possible implementation manner, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

According to a fifth aspect, an embodiment of the present invention provides a wireless access point control method, including:

entering, by a first wireless access point, a power-saving state, where the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point;

sending, by the first wireless access point, first information to user equipment, so that the user equipment sends an activation signal to the first wireless access point according to the first information to activate the first wireless access point, where the first information is used to indicate that the first wireless access point enters the power-saving state; or sending, by the first wireless access point, second information to a second wireless access point, so that the second wireless access point sends the second information to the user equipment, so that the user equipment sends an activation signal to the first wireless access point according to the second information to activate the first wireless access point, where the second information is used to indicate that the first wireless access point enters the power-saving state; and leaving, by the first wireless access point, the power-saving state after receiving the activation signal.

According to a sixth aspect, an embodiment of the present invention provides a wireless access point control method, including:

receiving first information sent by a first wireless access point, so as to send an activation signal to the first wireless access point according to the first information to activate the first wireless access point, so that the first wireless access point leaves a power-saving state, where the first information is used to indicate that the first wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

According to a seventh aspect, an embodiment of the present invention provides a wireless access point control method, including:

receiving indication information sent by a first wireless access point, so as to send an activation signal to a second wireless access point according to the indication information to activate the second wireless access point, so that the second wireless access point leaves a power-saving state, where the indication information sent by the first wireless access point is indication information sent by the second wireless access point and received by the first wireless access point, where the indication information is used to indicate that the second wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

According to an eighth aspect, an embodiment of the present invention provides a wireless access device, including:

a control unit, configured to control a first wireless access point to enter a power-saving state, where the power-saving state includes at least a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and a receiving unit, configured to receive, on the radio resource corresponding to the receiving pattern, an activation signal sent by user equipment, where the control unit is further configured to control the first wireless access point to leave the power-saving state according to the activation signal.

With reference to the eighth aspect, in a first possible implementation manner, the wireless access device further includes:

a sending unit, configured to send state information to a second wireless access point, so that the second wireless access point sends the state information to the user equipment served by the second wireless access point, where the state information is used to indicate the radio resource corresponding to the receiving pattern.

With reference to the eighth aspect or the first possible implementation manner of the eighth aspect, in a second possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the eighth aspect, in a third possible implementation manner, the power-saving state further includes a power-saving transmitting state, where the power-saving transmitting state is that the first wireless access point sends a signal on a radio resource corresponding to a sending pattern, and the radio resource corresponding to the sending pattern is a part of all radio resources supported by the first wireless access point; and the wireless access device further includes a sending unit, configured to send a wireless access point identity on the radio resource corresponding to the sending pattern, where the wireless access point identity is used to identify the first wireless access point.

With reference to the third possible implementation manner of the eighth aspect, in a fourth possible implementation manner, the wireless access point identity is at least one of a physical cell identity, a physical cell group identity, a sounding reference signal, a synchronization signal, and a channel status indication reference signal.

With reference to the third possible implementation manner of the eighth aspect or the fourth possible implementation manner of the eighth aspect, in a fifth possible implementation manner, the radio resource corresponding to the transmitting pattern is one or a combination of the following:

some frequencies in all frequencies supported by the first wireless access point;

some subframes in all subframes; and some code resources in all code resources supported by the first wireless access point.

With reference to any one possible implementation manner of the third possible implementation manner to the fifth possible implementation manner of the eighth aspect, in a sixth possible implementation manner, the sending unit is further configured to send state information to a second wireless access point, so that the second wireless access point sends the state information to the user equipment served by the second wireless access point, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

With reference to any one possible implementation manner of the third possible implementation manner to the sixth possible implementation manner of the eighth aspect, in a seventh possible implementation manner, the sending pattern and/or the receiving pattern is prestored, or the sending pattern and/or the receiving pattern is configured by the second wireless access point, or the sending pattern and/or the receiving pattern is acquired from a network management device.

With reference to any one possible implementation manner of the first possible implementation manner to the sixth possible implementation manner of the eighth aspect, in an eighth possible implementation manner, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

With reference to the eighth aspect or any one possible implementation manner of the first possible implementation manner to the eighth possible implementation manner of the eighth aspect, in a ninth possible implementation manner, the wireless access device further includes a sending unit, configured to send a notification indicating that the first wireless access point leaves the power-saving state, to the second wireless access point; or configured to send a notification indicating that the first wireless access point leaves the power-saving state, to the user equipment, where the notification indicating that the first wireless access point leaves the power-saving state includes at least one notification of a notification indicating that the first wireless access point leaves the power-saving receiving state or a notification indicating that the first wireless access point leaves the power-saving transmitting state.

According to a ninth aspect, an embodiment of the present invention provides user equipment, including:

an acquiring unit, configured to determine a receiving pattern that is used when a first wireless access point receives a signal in a power-saving state, where the power-saving state includes at least a power-saving receiving state, where the power-saving receiving state is that the first wireless access point receives the signal on a radio resource corresponding to the receiving pattern, and the radio resource corresponding to the receiving pattern is a part of all radio resources supported by the first wireless access point; and a sending unit, configured to send an activation signal on the radio resource corresponding to the receiving pattern, where the activation signal is used to instruct the first wireless access point to leave the power-saving state.

With reference to the ninth aspect, in a first possible implementation manner, the acquiring unit is specifically configured to receive configuration information sent by a second wireless access point, where the configuration information includes state information used to indicate the receiving pattern of the first wireless access point; and configured to determine the receiving pattern of the first wireless access point according to the configuration information.

With reference to the first possible implementation manner of the ninth aspect, in a second possible implementation manner, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

With reference to the ninth aspect or the first possible implementation manner or the second possible implementation manner of the ninth aspect, in a third possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the ninth aspect, in a fourth possible implementation manner, the acquiring unit is specifically configured to receive a wireless access point identity that is sent by the first wireless access point in a power-saving transmitting state included by the power-saving state, where the wireless access point identity is used to identify the first wireless access point, the power-saving transmitting state is that the first wireless access point sends a signal on a radio resource corresponding to a sending pattern, and the radio resource corresponding to the sending pattern is a part of all radio resources supported by the first wireless access point; and the acquiring unit is further configured to determine, according to the wireless access point identity, the receiving pattern that is used when the first wireless access point receives the signal in the power-saving state.

With reference to the fourth possible implementation manner of the ninth aspect, in a fifth possible implementation manner, the acquiring unit is further configured to receive configuration information sent by a second wireless access point, where the configuration information includes state information used to indicate the sending pattern of the first wireless access point; and the acquiring unit is further configured to receive, according to the transmitting pattern, the wireless access point identity that is sent by the first wireless access point in the power-saving transmitting state included by the power-saving state.

With reference to the fifth possible implementation manner of the ninth aspect, in a sixth possible implementation manner, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

With reference to any one possible implementation manner of the fourth possible implementation manner to the sixth possible implementation manner of the ninth aspect, in a seventh possible implementation manner, the acquiring unit is further configured to obtain, according to a time point of receiving the wireless access point identity, and a correspondence between the sending pattern and the receiving pattern of the first wireless access point, a time point of sending the activation signal; and the sending unit is further configured to send the activation signal at the time point of sending the activation signal, where the correspondence between the sending pattern and the receiving pattern is prestored or is notified by the second wireless access point.

With reference to any one possible implementation manner of the fourth possible implementation manner to the seventh possible implementation manner of the ninth aspect, in an eighth possible implementation manner, the wireless access point identity is at least one of a physical cell identity, a physical cell group identity, a sounding reference signal, a synchronization signal, and a channel status indication reference signal.

With reference to any one possible implementation manner of the first possible implementation manner to the seventh possible implementation manner of the ninth aspect, in a ninth possible implementation manner, the configuration information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

With reference to the ninth aspect, in a tenth possible implementation manner, the user equipment further includes:

a receiving unit, configured to receive a notification that is sent by the first wireless access point and indicates that the first wireless access point leaves the power-saving state, where the notification indicating that the first wireless access point leaves the power-saving state includes at least one notification of a notification indicating that the first wireless access point leaves the power-saving receiving state or a notification indicating that the first wireless access point leaves the power-saving transmitting state.

According to a tenth aspect, an embodiment of the present invention provides a wireless access device, including:

an acquiring unit, configured to acquire state information of a first wireless access point, where the state information is used to indicate a radio resource corresponding to a receiving pattern; and a sending unit, configured to send the state information of the first wireless access point to user equipment, so that the first wireless access point receives, on the radio resource corresponding to the receiving pattern, an activation signal that is sent by the user equipment according to the state information, and leaves a power-saving state according to the activation signal, where the power-saving state includes a power-saving receiving state, where the power-saving receiving state is that the first wireless access point receives a signal on the radio resource corresponding to the receiving pattern, and the radio resource corresponding to the receiving pattern is a part of all radio resources supported by the first wireless access point.

With reference to the tenth aspect, in a first possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the first possible implementation manner of the tenth aspect, in a second possible implementation manner, the state information further includes a wireless access point identity of the first wireless access point, where the wireless access point identity is used to identify the first wireless access point.

With reference to the second possible implementation manner of the tenth aspect, in a third possible implementation manner, the wireless access point identity is at least one of a physical cell identity, a physical cell group identity, a sounding reference signal, a synchronization signal, and a channel status indication reference signal.

With reference to the tenth aspect or the first possible implementation manner of the tenth aspect, in a fourth possible implementation manner, the state information further includes indication information, where the indication information is used to indicate that the first wireless access point is in one of the following states:

the first wireless access point is in the power-saving receiving state;

the first wireless access point is in a power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

According to an eleventh aspect, an embodiment of the present invention provides a wireless access device, including:

an acquiring unit, configured to acquire state information of a first wireless access point; and a sending unit, configured to send the state information of the first wireless access point to user equipment, so that the first wireless access point sends a wireless access point identity on a radio resource corresponding to a sending pattern, so that the user equipment sends an activation signal to the first wireless access point identified by the wireless access point identity, so that the first wireless access point receives, on a radio resource corresponding to a receiving pattern, the activation signal sent by the user equipment, and controls the first wireless access point to leave a power-saving state according to the activation signal, where the wireless access point identity is used to identify the first wireless access point, and the power-saving state includes a power-saving receiving state and a power-saving transmitting state, where the power-saving receiving state is that the first wireless access point receives a signal on the radio resource corresponding to the receiving pattern, the radio resource corresponding to the receiving pattern is a part of all radio resources supported by the first wireless access point, the power-saving transmitting state is that the first wireless access point sends a signal on the radio resource corresponding to the sending pattern, the radio resource corresponding to the sending pattern is a part of all radio resources supported by the first wireless access point, and the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

With reference to the eleventh aspect, in a first possible implementation manner, the wireless access point identity is at least one of a physical cell identity, a physical cell group identity, a sounding reference signal, a synchronization signal, and a channel status indication reference signal.

With reference to the first possible implementation manner of the eleventh aspect, in a second possible implementation manner, the radio resource corresponding to the transmitting pattern is one or a combination of the following:

some frequencies in all frequencies supported by the first wireless access point;

some subframes in all subframes; and some code resources in all code resources supported by the first wireless access point.

With reference to the eleventh aspect or the first possible implementation manner or the second possible implementation manner of the eleventh aspect, in a third possible implementation manner, the sending pattern and/or the receiving pattern is prestored, or the sending pattern and/or the receiving pattern is configured by a second wireless access point, or the sending pattern and/or the receiving pattern is acquired from a network management device.

With reference to the eleventh aspect, in a fourth possible implementation manner, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

According to a twelfth aspect, an embodiment of the present invention provides a wireless access device, including:

a control unit, configured to control a first wireless access point to enter a power-saving state, where the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point; and a sending unit, configured to send first information to user equipment, so that the user equipment sends an activation signal to the first wireless access point according to the first information to activate the first wireless access point, where the first information is used to indicate that the first wireless access point enters the power-saving state; or a sending unit, configured to send second information to a second wireless access point, so that the second wireless access point sends the second information to the user equipment, so that the user equipment sends an activation signal to the first wireless access point according to the second information to activate the first wireless access point, where the second information is used to indicate that the first wireless access point enters the power-saving state, where the control unit is further configured to control the first wireless access point to leave the power-saving state after the activation signal is received.

According to a thirteenth aspect, an embodiment of the present invention provides user equipment, including:

a receiving unit, configured to receive first information sent by a first wireless access point; and a sending unit, configured to send an activation signal to the first wireless access point according to the first information to activate the first wireless access point, so that the first wireless access point leaves a power-saving state, where the first information is used to indicate that the first wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

According to a fourteenth aspect, an embodiment of the present invention provides user equipment, including:

a receiving unit, configured to receive indication information sent by a first wireless access point; and a sending unit, configured to send an activation signal to a second wireless access point according to the indication information to activate the second wireless access point, so that the second wireless access point leaves a power-saving state, where the indication information sent by the first wireless access point is indication information sent by the second wireless access point and received by the first wireless access point, where the indication information is used to indicate that the second wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

According to a fifteenth aspect, an embodiment of the present invention provides a wireless access device, including an input apparatus, an output apparatus, a memory, and a processor, where the memory stores a set of program code, and the processor is configured to invoke the program code stored in the memory to execute the following operations:

controlling a first wireless access point to enter a power-saving state, where the power-saving state includes at least a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point;

receiving, on the radio resource corresponding to the receiving pattern, an activation signal sent by user equipment; and controlling the first wireless access point to leave the power-saving state according to the activation signal.

With reference to the fifteenth aspect, in a first possible implementation manner, before executing the operation of receiving, on the radio resource indicated by the receiving pattern, an activation signal sent by user equipment, the processor is further configured to execute the following operation:

sending state information to a second wireless access point, so that the second wireless access point sends the state information to the user equipment served by the second wireless access point, where the state information is used to indicate the radio resource corresponding to the receiving pattern.

With reference to the fifteenth aspect or the first possible implementation manner of the fifteenth aspect, in a second possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the fifteenth aspect, in a third possible implementation manner, the power-saving state further includes a power-saving transmitting state, where the power-saving transmitting state is that the first wireless access point sends a signal on a radio resource corresponding to a sending pattern, and the radio resource corresponding to the sending pattern is a part of all radio resources supported by the first wireless access point; and before executing the operation of receiving, by the first wireless access point, on the radio resource corresponding to the receiving pattern, an activation signal sent by user equipment, the processor is further configured to execute the following operation:

sending a wireless access point identity on the radio resource corresponding to the sending pattern, where the wireless access point identity is used to identify the first wireless access point.

With reference to the third possible implementation manner of the fifteenth aspect, in a fourth possible implementation manner, the wireless access point identity is at least one of a physical cell identity, a physical cell group identity, a sounding reference signal, a synchronization signal, and a channel status indication reference signal.

With reference to the third possible implementation manner or the fourth possible implementation manner of the fifteenth aspect, in a fifth possible implementation manner, the radio resource corresponding to the transmitting pattern is one or a combination of the following:

some frequencies in all frequencies supported by the first wireless access point;

some subframes in all subframes; and some code resources in all code resources supported by the first wireless access point.

With reference to the third possible implementation manner of the fifteenth aspect to the fifth possible implementation manner of the fifteenth aspect, in a sixth possible implementation manner, before executing the operation of sending, by the first wireless access point, a wireless access point identity on the radio resource corresponding to the sending pattern, the processor is further configured to execute the following operation:

sending state information to a second wireless access point, so that the second wireless access point sends the state information to the user equipment served by the second wireless access point, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

With reference to the third possible implementation manner of the fifteenth aspect to the sixth possible implementation manner of the fifteenth aspect, in a seventh possible implementation manner, the sending pattern and/or the receiving pattern is prestored, or the sending pattern and/or the receiving pattern is configured by the second wireless access point, or the sending pattern and/or the receiving pattern is acquired from a network management device.

With reference to the first possible implementation manner of the fifteenth aspect to the sixth possible implementation manner of the fifteenth aspect, in an eighth possible implementation manner, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

With reference to the fifteenth aspect or the first possible implementation manner of the fifteenth aspect to the seventh possible implementation manner of the fifteenth aspect, in a ninth possible implementation manner, after executing the operation of controlling the first wireless access point to leave the power-saving state according to the activation signal, the processor is further configured to execute the following operation:

sending a notification indicating that the first wireless access point leaves the power-saving state, to the second wireless access point; or sending a notification indicating that the first wireless access point leaves the power-saving state, to the user equipment, where the notification indicating that the first wireless access point leaves the power-saving state includes at least one notification of a notification indicating that the first wireless access point leaves the power-saving receiving state or a notification indicating that the first wireless access point leaves the power-saving transmitting state.

According to a sixteenth aspect, an embodiment of the present invention provides user equipment, including an input apparatus, an output apparatus, a memory, and a processor, where the memory stores a set of program code, and the processor is configured to invoke the program code stored in the memory to execute the following operations:

determining a receiving pattern that is used when a first wireless access point receives a signal in a power-saving state, where the power-saving state includes at least a power-saving receiving state, where the power-saving receiving state is that the first wireless access point receives the signal on a radio resource corresponding to the receiving pattern, and the radio resource corresponding to the receiving pattern is a part of all radio resources supported by the first wireless access point; and sending an activation signal on the radio resource corresponding to the receiving pattern, where the activation signal is used to instruct the first wireless access point to leave the power-saving state.

With reference to the sixteenth aspect, in a first possible implementation manner, the executing, by the processor, the operation of determining a receiving pattern that is used when a first wireless access point receives a signal in a power-saving state, includes:

receiving configuration information sent by a second wireless access point, where the configuration information includes state information used to indicate the receiving pattern of the first wireless access point; and determining the receiving pattern of the first wireless access point according to the configuration information.

With reference to the first possible implementation manner of the sixteenth aspect, in a second possible implementation manner, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

With reference to the sixteenth aspect or the first possible implementation manner or the second possible implementation manner of the sixteenth aspect, in a third possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the sixteenth aspect, in a fourth possible implementation manner, the executing, by the processor, the operation of determining a receiving pattern that is used when a first wireless access point receives a signal in a power-saving state, includes:

receiving a wireless access point identity that is sent by the first wireless access point in a power-saving transmitting state included by the power-saving state, where the wireless access point identity is used to identify the first wireless access point, the power-saving transmitting state is that the first wireless access point sends a signal on a radio resource corresponding to a sending pattern, and the radio resource corresponding to the sending pattern is a part of all radio resources supported by the first wireless access point; and determining, according to the wireless access point identity, the receiving pattern that is used when the first wireless access point receives the signal in the power-saving state.

With reference to the fourth possible implementation manner of the sixteenth aspect, in a fifth possible implementation manner, before executing the operation of receiving a wireless access point identity, the processor is further configured to execute the following operation:

receiving configuration information sent by a second wireless access point, where the configuration information includes state information used to indicate the sending pattern of the first wireless access point; and the executing, by the processor, the operation of receiving a wireless access point identity that is sent by the first wireless access point in a power-saving transmitting state included by the power-saving state, includes:

receiving, according to the transmitting pattern, the wireless access point identity that is sent by the first wireless access point in the power-saving transmitting state included by the power-saving state.

With reference to the fifth possible implementation manner of the sixteenth aspect, in a sixth possible implementation manner, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

With reference to any one possible implementation manner of the fourth possible implementation manner to the sixth possible implementation manner of the sixteenth aspect, in a seventh possible implementation manner, the executing, by the processor, the operation of determining, according to the wireless access point identity, the receiving pattern that is used when the first wireless access point receives the signal in the power-saving state, includes:

obtaining, according to a time point of receiving the wireless access point identity, and a correspondence between the sending pattern and the receiving pattern of the first wireless access point, a time point of sending the activation signal; and the sending an activation signal on the radio resource corresponding to the receiving pattern includes:

sending the activation signal at the time point of sending the activation signal, where the correspondence between the sending pattern and the receiving pattern is prestored or is notified by the second wireless access point.

With reference to any one possible implementation manner of the fourth possible implementation manner of the sixteenth aspect to the seventh possible implementation manner of the sixteenth aspect, in an eighth possible implementation manner, the wireless access point identity is at least one of a physical cell identity, a physical cell group identity, a sounding reference signal, a synchronization signal, and a channel status indication reference signal.

With reference to any one possible implementation manner of the first possible implementation manner of the sixteenth aspect to the seventh possible implementation manner of the sixteenth aspect, in a ninth possible implementation manner, the configuration information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

With reference to the sixteenth aspect, in a tenth possible implementation manner, after the processor executes the operation of sending an activation signal on the radio resource corresponding to the receiving pattern, the processor is further configured to execute the following operation:

receiving a notification that is sent by the first wireless access point and indicates that the first wireless access point leaves the power-saving state, where the notification indicating that the first wireless access point leaves the power-saving state includes at least one notification of a notification indicating that the first wireless access point leaves the power-saving receiving state or a notification indicating that the first wireless access point leaves the power-saving transmitting state.

According to a seventeenth aspect, an embodiment of the present invention provides a wireless access device, including an input apparatus, an output apparatus, a memory, and a processor, where the memory stores a set of program code, and the processor is configured to invoke the program code stored in the memory to execute the following operations:

acquiring state information of a first wireless access point, where the state information is used to indicate a radio resource corresponding to a receiving pattern; and sending the state information of the first wireless access point to user equipment, so that the first wireless access point receives, on the radio resource corresponding to the receiving pattern, an activation signal that is sent by the user equipment according to the state information, and leaves a power-saving state according to the activation signal, where the power-saving state includes a power-saving receiving state, where the power-saving receiving state is that the first wireless access point receives a signal on the radio resource corresponding to the receiving pattern, and the radio resource corresponding to the receiving pattern is a part of all radio resources supported by the first wireless access point.

With reference to the seventeenth aspect, in a first possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

With reference to the first possible implementation manner of the seventeenth aspect, in a second possible implementation manner, the state information further includes a wireless access point identity of the first wireless access point, where the wireless access point identity is used to identify the first wireless access point.

With reference to the second possible implementation manner of the seventeenth aspect, in a third possible implementation manner, the wireless access point identity is at least one of a physical cell identity, a physical cell group identity, a sounding reference signal, a synchronization signal, and a channel status indication reference signal.

With reference to the seventeenth aspect or the first possible implementation manner of the seventeenth aspect, in a fourth possible implementation manner, the state information further includes indication information, where the indication information is used to indicate that the first wireless access point is in one of the following states:

the first wireless access point is in the power-saving receiving state;

the first wireless access point is in a power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

According to an eighteenth aspect, an embodiment of the present invention provides a wireless access device, including an input apparatus, an output apparatus, a memory, and a processor, where the memory stores a set of program code, and the processor is configured to invoke the program code stored in the memory to execute the following operations:

acquiring state information of a first wireless access point; and sending the state information of the first wireless access point to user equipment, so that the first wireless access point sends a wireless access point identity on a radio resource corresponding to a sending pattern, so that the user equipment sends an activation signal to the first wireless access point identified by the wireless access point identity, so that the first wireless access point receives, on a radio resource corresponding to a receiving pattern, the activation signal sent by the user equipment, and leaves a power-saving state according to the activation signal, where the wireless access point identity is used to identify the first wireless access point, and the power-saving state includes a power-saving receiving state and a power-saving transmitting state, where the power-saving receiving state is that the first wireless access point receives a signal on the radio resource corresponding to the receiving pattern, the radio resource corresponding to the receiving pattern is a part of all radio resources supported by the first wireless access point, the power-saving transmitting state is that the first wireless access point sends a signal on the radio resource corresponding to the sending pattern, the radio resource corresponding to the sending pattern is a part of all radio resources supported by the first wireless access point, and the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

With reference to the eighteenth aspect, in a first possible implementation manner, the wireless access point identity is at least one of a physical cell identity, a physical cell group identity, a sounding reference signal, a synchronization signal, and a channel status indication reference signal.

With reference to the first possible implementation manner of the eighteenth aspect, in a second possible implementation manner, the radio resource corresponding to the transmitting pattern is one or a combination of the following:

some frequencies in all frequencies supported by the first wireless access point;

some subframes in all subframes; and some code resources in all code resources supported by the first wireless access point.

With reference to the eighteenth aspect or the first possible implementation manner or the second possible implementation manner of the eighteenth aspect, in a third possible implementation manner, the sending pattern and/or the receiving pattern is prestored, or the sending pattern and/or the receiving pattern is configured by a second wireless access point, or the sending pattern and/or the receiving pattern is acquired from a network management device.

With reference to the eighteenth aspect, in a fourth possible implementation manner, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

According to a nineteenth aspect, an embodiment of the present invention provides a wireless access device, including an input apparatus, an output apparatus, a memory, and a processor, where the memory stores a set of program code, and the processor is configured to invoke the program code stored in the memory to execute the following operations:

controlling a first wireless access point to enter a power-saving state, where the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point;

sending first information to user equipment, so that the user equipment sends an activation signal to the first wireless access point according to the first information to activate the first wireless access point, where the first information is used to indicate that the first wireless access point enters the power-saving state; or sending second information to a second wireless access point, so that the second wireless access point sends the second information to the user equipment, so that the user equipment sends an activation signal to the first wireless access point according to the second information to activate the first wireless access point, where the second information is used to indicate that the first wireless access point enters the power-saving state; and controlling the first wireless access point to leave the power-saving state after the activation signal is received.

According to a twentieth aspect, an embodiment of the present invention provides user equipment, including an input apparatus, an output apparatus, a memory, and a processor, where the memory stores a set of program code, and the processor is configured to invoke the program code stored in the memory to execute the following operations:

receiving first information sent by a first wireless access point, so as to send an activation signal to the first wireless access point according to the first information to activate the first wireless access point, so that the first wireless access point leaves a power-saving state, where the first information is used to indicate that the first wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

According to a twenty-first aspect, an embodiment of the present invention provides user equipment, including an input apparatus, an output apparatus, a memory, and a processor, where the memory stores a set of program code, and the processor is configured to invoke the program code stored in the memory to execute the following operations:

receiving indication information sent by a first wireless access point, so as to send an activation signal to a second wireless access point according to the indication information to activate the second wireless access point, so that the second wireless access point leaves a power-saving state, where the indication information sent by the first wireless access point is indication information sent by the second wireless access point and received by the first wireless access point, where the indication information is used to indicate that the second wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

According to a twenty-second aspect, an embodiment of the present invention provides a wireless access control system, including a first wireless access point and user equipment, where the first wireless access point enters a power-saving state, where the power-saving state includes at least a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point;

the first wireless access point is configured to receive, on the radio resource corresponding to the receiving pattern, an activation signal sent by the user equipment; and the first wireless access point is further configured to leave the power-saving state according to the activation signal.

With reference to the twenty-second aspect, in a first possible implementation manner, the wireless access control system further includes a second wireless access point, where the second wireless access point is configured to receive state information sent by the first wireless access point, so as to send the state information to the user equipment served by the second wireless access point, where the state information is used to indicate the radio resource corresponding to the receiving pattern.

With reference to the twenty-second aspect or the first possible implementation manner of the twenty-second aspect, in a second possible implementation manner, the radio resource corresponding to the receiving pattern is one or a combination of the following:

some frequencies in all frequencies supported by the first wireless access point;

some subframes in all subframes; and some code resources in all code resources supported by the first wireless access point.

According to the wireless access point control method, the related device, and the system provided by the embodiments of the present invention, an activation signal sent by user equipment is received on a radio resource corresponding to a receiving pattern of a first wireless access point, so that the first wireless access point controls itself to leave a power-saving state according to the activation signal. Therefore, the user equipment may directly send the activation signal to the first wireless access point to switch a working state of the first wireless access point from the power-saving state to a normal communication state as soon as possible. In this manner, a power-saving objective of the wireless access point is achieved, and switching of the wireless access point from the power-saving state to the normal communication state as soon as possible can also be accelerated on a basis of achieving power saving of the wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

The present invention is hereinafter described in detail with reference to the accompanying drawings. A wireless access point and a neighboring wireless access point provided by the embodiments of the present invention are nodes communicating with user equipment by using radio signals, have a scheduling function, and specifically, may be base stations or relay nodes. Alternatively, a system jointly formed by a remote radio unit and a baseband processing unit may implement the wireless access point. Alternatively, a system jointly formed by a baseband unit and a server may implement the wireless access point, where the server controls, by using a communications interface of a remote radio unit or the baseband unit, switching of the remote radio unit or the baseband unit between a power-saving state and a normal communication state. In the following embodiments, a wireless access point control method and some related devices provided by the embodiments of the present invention are described by using a base station as a wireless access point and a neighboring base station as a neighboring wireless access point.

Figure 1A:
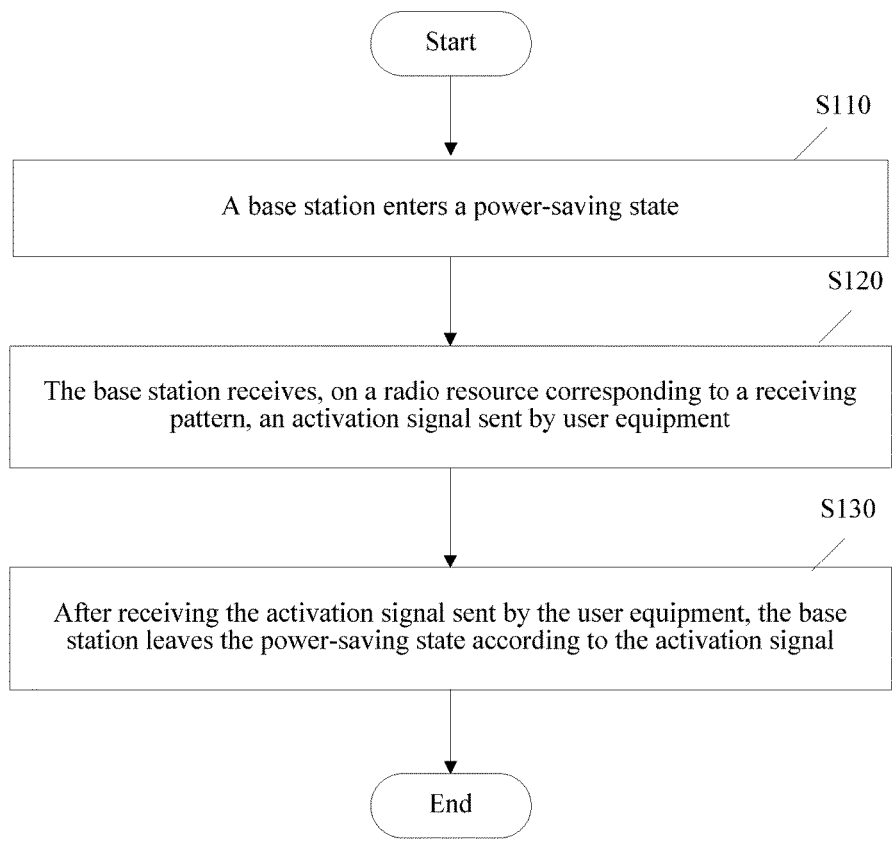
FIG. 1a is a flowchart of a base station control method according to a first embodiment of the present invention.
Figure 1B:
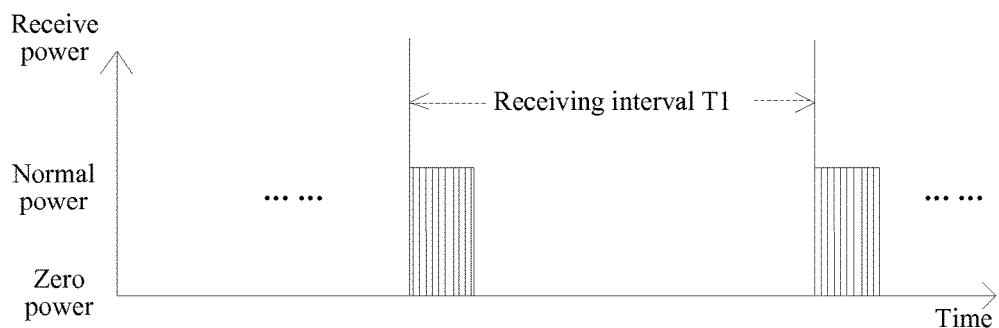
FIG. 1b is an exemplary diagram of a power-saving receiving pattern of a base station according to the first embodiment of the present invention.
Figure 1C:
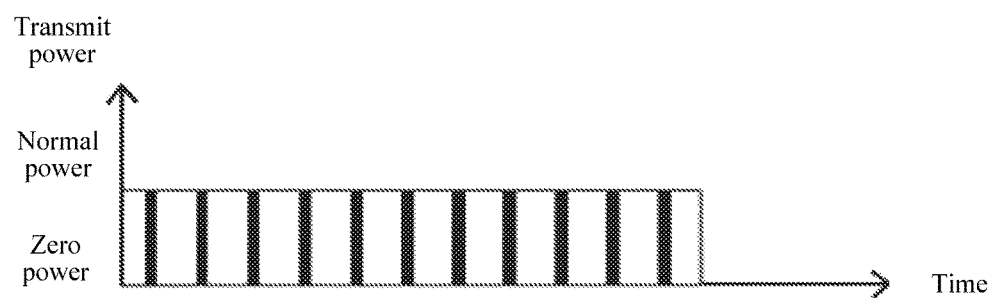
FIG. 1c is an exemplary diagram of a normal transmitting pattern of the base station according to the first embodiment of the present invention.
Figure 1D:
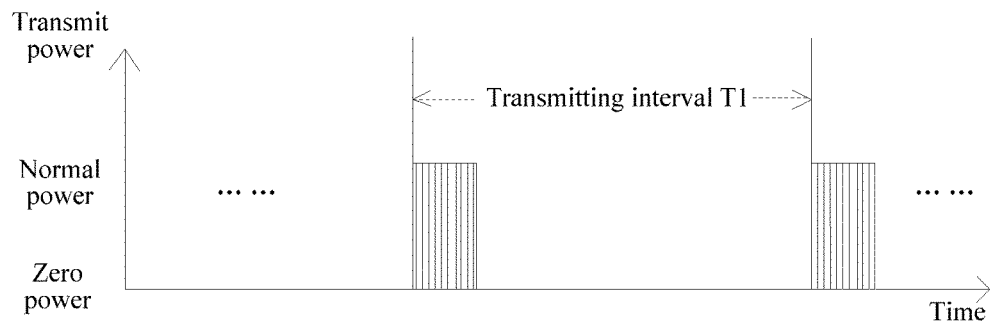
FIG. 1d is an exemplary diagram of a transmitting pattern of user equipment according to the first embodiment of the present invention.

Referring to FIG. 1a to FIG. 1d, FIG. 1a is a flowchart of a base station control method according to a first embodiment of the present invention; FIG. 1b is an exemplary diagram of a power-saving receiving pattern of a base station according to the first embodiment of the present invention; FIG. 1c is an exemplary diagram of a normal transmitting pattern of the base station according to the first embodiment of the present invention; and FIG. 1d is an exemplary diagram of a transmitting pattern of user equipment according to the first embodiment of the present invention. A procedure based on the base station control method shown in FIG. 1a is described from a perspective of a micro base station. As shown in FIG. 1a, the base station control method provided by this embodiment includes:

S110. A Base Station Enters a Power-Saving State.

The power-saving state includes at least a power-saving receiving state, where the power-saving receiving state is that the base station receives a signal on a radio resource corresponding to a receiving pattern, and the radio resource corresponding to the receiving pattern is a part of all radio resources supported by the base station.

Optionally, in an embodiment, the power-saving receiving state of the base station may be that the base station performs reception intermittently according to a preset time. Specifically, the base station may configure the power-saving receiving state of the base station by using configuration information that instructs the base station to receive a signal on a discontinuous receiving radio resource, so that the base station receives the signal on the discontinuous receiving radio resource. Specifically, the power-saving receiving state of the base station may be configured according to configuration information of a physical resource block (Physical Resource Block, PRB) configuration or a subframe configuration.

As shown in FIG. 1b, the power-saving state of the base station includes only the power-saving receiving state, that is, the base station performs reception intermittently on a receiving working frequency according to a preset time. As shown in FIG. 1c, the power-saving state of the base station in this embodiment does not include a power-saving transmitting state, that is, the base station is in a normal transmitting communication mode, and the base station transmits a signal on a sending working frequency according to a normal transmitting state.

In other embodiments, the power-saving state of the base station may further include the power-saving transmitting state of the base station, that is, the base station is in a non-transmitting communication mode or the base station performs transmission intermittently according to a time interval. Specifically, the power-saving transmitting state of the base station may be configured according to configuration information of a discontinuous transmitting radio resource. The power-saving transmitting state of the base station may be configured according to at least configuration information of a physical resource block (Physical Resource Block, PRB) configuration or a subframe configuration.

S120. The base station receives, on a radio resource corresponding to a receiving pattern, an activation signal sent by user equipment.

Optionally, the base station receives, on a radio resource corresponding to a power-saving receiving pattern on the receiving working frequency, the activation signal sent by the user equipment. The activation signal is a predefined known sequence, and specifically, may be a specific random access code. Content of the known sequence may be defined in a form specified by a predetermined protocol.

In an optional implementation manner, before step S120 shown in FIG. 1a is performed, that is, before the base station receives, on the radio resource indicated by the receiving pattern, the activation signal sent by the user equipment, the method further includes:

the base station sends state information to a neighboring base station, so that the neighboring base station sends the state information to the user equipment served by the neighboring base station, where the state information is used to indicate the radio resource corresponding to the receiving pattern.

Optionally, the base station sends the state information to the neighboring base station through a signaling interface, so that the neighboring base station sends the state information to the user equipment served by the neighboring base station, so that the user equipment acquires the power-saving receiving state of the base station and the receiving working frequency of the base station according to the state information and that the user equipment sends the activation signal to the base station on the radio resource corresponding to the power-saving receiving pattern on the receiving working frequency of the base station.

Optionally, the state information may include the power-saving receiving state of the base station and the receiving working frequency of the base station. As shown in FIG. 1b, the power-saving receiving state of the base station is that the base station performs reception intermittently according to a preset time. Specifically, starting from a start time point, reception may be performed intermittently according to a time interval T1. For example, using a position of a subframe 0 of a radio frame whose frame number is 0 as a start time point, reception is performed once every 200 milliseconds; or reception is performed at a preset time point, for example, reception is performed on a subframe 1 of each radio frame, or reception is performed on a subframe 1 and a subframe 6 of each radio frame whose frame number is an integer multiple of 4, or the like. In the two examples, the user equipment needs to first determine a timing of the base station, and specifically may determine a current subframe according to a wireless access point identity transmitted by the base station; or timings of the base station and the neighboring base station are synchronous, and the user equipment determines the timing of the base station by determining the timing of the neighboring base station. A timing relationship of the neighboring base station and a timing relationship of the base station are synchronous, or a fixed offset exists therebetween, and therefore the user equipment may know the timing relationship of the base station after acquiring the configuration information sent by the neighboring base station.

Optionally, the radio resource corresponding to the receiving pattern is one or a combination of the following:

some frequencies in all frequencies supported by the base station;

some subframes in all subframes; and some code resources in all code resources supported by the base station.

S130. After receiving the activation signal sent by the user equipment, the base station leaves the power-saving state according to the activation signal.

In the base station control method provided by this embodiment, a base station receives, on a radio resource corresponding to a power-saving receiving pattern of the base station, an activation signal sent by user equipment, so that the base station controls itself to leave a power-saving state. Therefore, the user equipment may directly send the activation signal to the base station to switch a working state of the base station from the power-saving state to a normal communication state as soon as possible. In this manner, a power-saving objective of the base station is achieved, and switching of the base station from the power-saving state to the normal communication state as soon as possible can also be accelerated on a basis of achieving power saving of the base station, so that services may be provided for the user equipment as soon as possible.

Optionally, as shown in FIG. 1d, the user equipment acquires the receiving working frequency and power-saving receiving state of the base station according to the state information, and determines that the base station may receive the activation signal intermittently according to a preset time, namely, according to the time interval T1, on the radio resource corresponding to the power-saving receiving pattern on the receiving working frequency, and therefore, a transmitting state of the user equipment is that the activation signal is transmitted to the base station, on the radio resource corresponding to the power-saving receiving pattern on the receiving working frequency of the base station. Specifically, one activation signal may be transmitted; or the user equipment may transmit the activation signal to the base station intermittently according to a preset time, namely, according to the time interval T1, on the radio resource corresponding to the power-saving receiving pattern of the base station, or may transmit the activation signal to the base station on several radio resources corresponding to the power-saving receiving pattern of the base station to activate the base station in the power-saving state, so that the base station leaves the power-saving state and switches to the normal communication state. That is, a transmitting working frequency of the user equipment is the same as the receiving working frequency of the base station. The configuration information further includes at least one start time point, where the start time point may be relative or fixedly unchanged. After the base station enters the power-saving state, from the at least one start time point, the base station receives the activation signal on the receiving working frequency of the base station according to at least one time interval, so that the user equipment sends the activation signal to the base station to activate the base station.

In an optional implementation manner, before step S110 shown in FIG. 1a is performed, that is, before the base station enters the power-saving state, the method further includes: the base station acquires configuration information of the power-saving state of the base station, where the configuration information of the power-saving state of the base station is used by the base station to set the power-saving state of the base station. The configuration information of the power-saving state includes at least the power-saving state of the base station, and the receiving working frequency of the base station and the transmitting working frequency of the base station when the base station is in the power-saving state. In this embodiment, the power-saving state of the base station includes only the power-saving receiving state of the base station. Before the base station enters the power-saving state, there are multiple implementation manners of a technology for configuring the power-saving state of the base station by the base station. For example, in this implementation manner, the base station may acquire the configuration information of the power-saving state of the base station from a network management system, and then send the configuration information including the power-saving receiving state of the base station and the receiving working frequency of the base station to the neighboring base station, so that the neighboring base station sends the configuration information to the user equipment served by the neighboring base station.

In an optional implementation manner, the base station may also determine the configuration information of the power-saving state of the base station, and then send the configuration information including the power-saving receiving state of the base station and the receiving working frequency of the base station to the neighboring base station, so that the neighboring base station sends the configuration information to the user equipment served by the neighboring base station.

Specific implementation manners of the technology for configuring the power-saving state of the base station by the base station do not constitute limitations to this embodiment. In an optional implementation manner, the base station may further acquire the configuration information of the power-saving state of the base station from the neighboring base station serving the user equipment, and then set the power-saving state of the base station according to the configuration information of the power-saving state, so that the base station enters the power-saving state. Therefore, in this implementation manner, after the base station enters the power-saving state, the configuration information including the power-saving receiving state of the base station and the receiving working frequency of the base station does not need to be sent to the neighboring base station serving the user equipment and then forwarded by the neighboring base station to the user equipment so that the user equipment knows the power-saving state of the base station. Instead, the configuration information including the power-saving receiving state of the base station and the receiving working frequency of the base station may be directly sent by the neighboring base station to the user equipment. Therefore, the neighboring base station serving the user equipment may determine, by itself, the configuration information of the power-saving state of the base station, or acquire the configuration information of the power-saving state of the base station from the network management system, and then send the configuration information of the power-saving state of the base station to the base station, so that the base station sets the power-saving state of the base station, and send the configuration information including the power-saving receiving state of the base station and the receiving working frequency of the base station to the user equipment, so that the user equipment knows the power-saving state of the base station and sends the activation signal to the base station on the radio resource corresponding to the power-saving state on the receiving working frequency of the base station to activate the base station. The configuration information of the power-saving state includes at least the power-saving state of the base station, and the receiving working frequency of the base station and the transmitting working frequency of the base station when the base station is in the power-saving state.

In an optional implementation manner, the base station and the neighboring base station serving the user equipment may separately acquire the configuration information of the power-saving state from the network management system, and then the base station configures the power-saving state of the base station according to the configuration information of the power-saving state, while the neighboring base station directly sends the configuration information including the power-saving receiving state of the base station and the receiving working frequency of the base station to the user equipment, so that the user equipment determine the power-saving receiving state of the base station and sends the activation signal to the base station on the radio resource corresponding to the power-saving receiving pattern on the receiving working frequency of the base station to activate the base station, so that the base station leaves the power-saving state. In this implementation manner in which the base station does not need to forward the configuration information to the user equipment by using the neighboring base station, the configuration information of the power-saving receiving state of the base station and the receiving working frequency of the base station that are included in the configuration information of the power-saving state acquired by the neighboring base station from the network management system may be sent to the user equipment. The configuration information of the power-saving state includes at least the power-saving state of the base station, and the receiving working frequency of the base station and the transmitting working frequency of the base station when the base station is in the power-saving state. In this embodiment, the power-saving state of the base station includes only the power-saving receiving state of the base station.

Optionally, regardless of whether the base station acquires the configuration information from the network management system or acquires the configuration information from the neighboring serving base station, or the neighboring base station serving the user equipment acquires the configuration information from the base station or the network management system, configuration information of base stations having a same working frequency may be defined to be the same, or configuration information of base stations may be defined to be different. A specific manner of defining the configuration information is not limited in this embodiment.

In an optional implementation manner, when the transmitting state of the base station is the power-saving transmitting state or normal transmitting state, before step S120 shown in FIG. 1a is performed, that is, before the base station receives, on the radio resource corresponding to the receiving pattern, the activation signal sent by the user equipment, the method further includes:

the base station sends the wireless access point identity on a radio resource corresponding to a sending pattern, where the power-saving transmitting state is that the base station sends a signal on the radio resource corresponding to the sending pattern, and the radio resource corresponding to the sending pattern is a part of all radio resources supported by the first wireless access point.

In an optional implementation manner, before the base station sends the wireless access point identity on the radio resource corresponding to the sending pattern, the method further includes:

the base station sends the state information to the neighboring base station, so that the neighboring base station sends the state information to the user equipment served by the neighboring base station, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

Optionally, the correspondence between the sending pattern and the receiving pattern may be a correspondence between one or more of a time resource, a frequency resource, and a code resource that are included in the sending pattern and one or more of a time resource, a frequency resource, and a code resource that are included in the receiving pattern.

Optionally, the sending pattern and/or the receiving pattern is prestored, or the sending pattern and/or the receiving pattern is configured by the neighboring base station, or the sending pattern and/or the receiving pattern is acquired from a network management device.

Optionally, the radio resource corresponding to the transmitting pattern is one or a combination of the following:

some frequencies in all frequencies supported by the base station;

some subframes in all subframes; and some code resources in all code resources supported by the base station.

Optionally, the base station may send the wireless access point identity on the radio resource corresponding to the transmitting pattern on the transmitting working frequency of the base station, so that the user equipment receives the wireless access point identity, and then the user equipment sends the activation signal to the base station on the radio resource corresponding to the power-saving receiving pattern on the receiving working frequency of the base station corresponding to the wireless access point identity.

The wireless access point identity is used to identify an identity of the base station.

The base station includes one or more cells or access points, where the access points may be remote radio units, and each cell or access point of the base station needs at least one piece of identity information for identifying the cell or access point. Herein the identity information is collectively called "a wireless access point identity". The wireless access point identity may specifically be at least one of a physical cell identity (Physical Cell Identity, PCI), a physical cell group identity, a sounding reference signal (Sounding reference signals, SRS), a synchronization signal, a synchronization pilot signal, and a channel status indication reference signal (Channel status indication reference signal, CSI-RS).

The sounding reference signal, synchronization signal, and synchronization pilot signal include wireless access node identity information. Specifically, the node identity information may be encoded in the signal. The channel status indication reference signal uses a time-frequency code resource of a radio resource used for transmitting the signal, to identify itself and further identify the wireless access point, because the radio signal is transmitted by the wireless access point.

In an optional implementation manner, the state information further includes indication information, where the indication information is used to indicate that the base station is in one of the following states:

the base station is in the power-saving receiving state;

the base station is in the power-saving transmitting state;

the base station is in the power-saving receiving state and the normal transmitting state;

the base station is in the power-saving transmitting state and the power-saving receiving state;

the base station is in a normal receiving state and the normal transmitting state;

the base station is in the normal receiving state and the power-saving transmitting state;

the base station is in the power-saving state; and the base station is in a non-power-saving state, so that the user equipment determines whether to send the activation signal to the base station to cause the base station in the power-saving state to leave the power-saving state.

In an optional implementation manner, after step S130 shown in FIG. 1a is performed, that is, after the base station leaves the power-saving state, the method further includes:

the base station sends a notification indicating that the base station leaves the power-saving state, to the user equipment, so as to notify the user equipment that link establishment may be initiated, so that subsequent service communication may be performed, or to notify the user equipment that it is unnecessary to resend the activation signal. If the user equipment receives the notification sent by the base station and indicating that the base station leaves the power-saving state, the user equipment no longer sends the activation signal to the base station; or if the user equipment does not receive the notification sent by the base station and indicating that the base station leaves the power-saving state, the user equipment resends the activation signal to the base station, so that the base station leaves the power-saving state; or after the number of times that the user equipment sends the activation signal reaches a preconfigured number, the user equipment stops sending the activation signal to the base station, so that the base station leaves the power-saving state; or after the number of times that the user equipment sends the activation signal reaches a preconfigured number, the user equipment stops sending the activation signal to the base station, and starts a timer, where duration of the timer is preconfigured, and when the timer expires, the user equipment may resend the activation signal to the base station, so that the base station leaves the power-saving state.

In an optional implementation manner, after the base station enters the power-saving state, the base station may send a notification indicating that the base station enters the power-saving state, to the user equipment, so that the user equipment acquires that the base station enters the power-saving state.

In an optional implementation manner, after step S130 shown in FIG. 1a is performed, that is, after the base station leaves the power-saving state, the method further includes:

the base station indicates, to the neighboring base station through a communications interface with the neighboring base station, that the base station leaves the power-saving state, and specifically, may indicate that the base station leaves the power-saving receiving state, or indicate that the base station leaves the power-saving transmitting state, or indicate that the base station leaves the power-saving receiving state and the power-saving transmitting state, so that the neighboring base station may adjust services, for example, hand over the user equipment served by the neighboring base station to the base station; or the neighboring base station in the power-saving state is activated, so that the neighboring base station shares service load, and the activated neighboring base station sends indication information indicating that the neighboring base station leaves the power-saving state, to the user equipment, so that the user equipment can also establish a communications link with the neighboring base station to perform service communication. In this embodiment, the power-saving state of the base station includes only the power-saving receiving state, and therefore, the base station indicates, to the neighboring base station through the communications interface with the neighboring base station, that the base station leaves the power-saving receiving state.

Figure 2A:
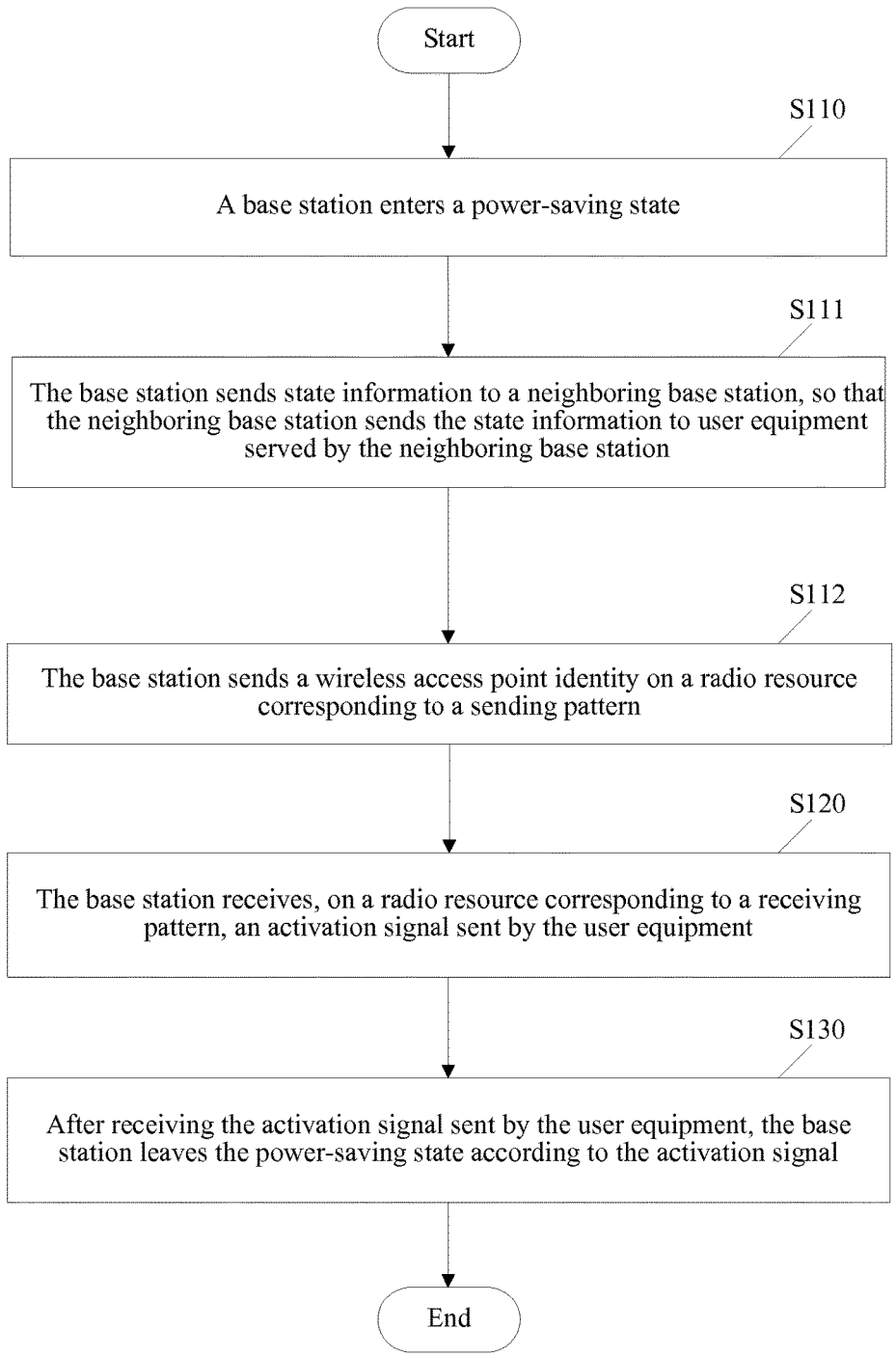
FIG. 2a is a flowchart of a base station control method according to a second embodiment of the present invention.
Figure 2B:
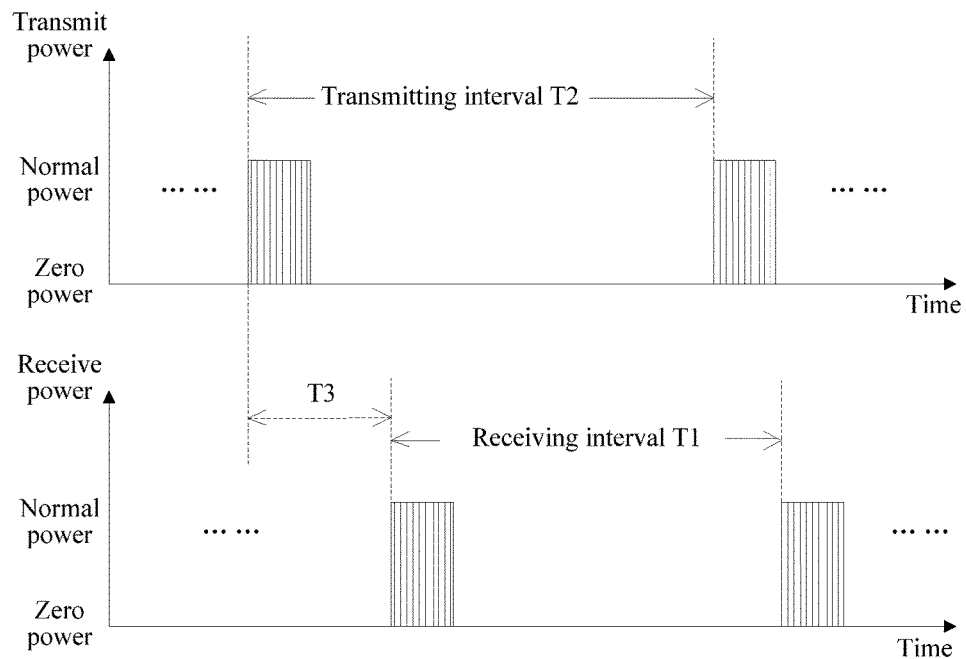
FIG. 2b is a schematic diagram of a time association relationship between a power-saving transmitting pattern of a base station and a power-saving receiving pattern of the base station according to the second embodiment of the present invention.

Referring to FIG. 2a and FIG. 2b, FIG. 2a is a flowchart of a base station control method according to a second embodiment of the present invention, and FIG. 2b is a schematic diagram of a time association relationship between a power-saving transmitting pattern of a base station and a power-saving receiving pattern of the base station according to the second embodiment of the present invention. The base station control method provided by this embodiment is described from a perspective of a base station. In this embodiment, a power-saving state includes a power-saving transmitting state in addition to a power-saving receiving state, where the power-saving receiving state is that the base station receives a signal on a radio resource corresponding to a receiving pattern, and the radio resource corresponding to the receiving pattern is a part of all radio resources supported by the base station.

Optionally, the radio resource corresponding to the receiving pattern is one or a combination of the following:
some frequencies in all frequencies supported by the base station;
some subframes in all subframes; and
some code resources in all code resources supported by the base station.

The power-saving transmitting state is that the base station sends a signal on a radio resource corresponding to a sending pattern, and the radio resource corresponding to the sending pattern is a part of all radio resources supported by the base station.

Referring to FIG. 1a, as shown in FIG. 2a, before step S120 shown in FIG. 1a is performed, that is, before the base station receives, on a radio resource corresponding to a receiving pattern, an activation signal sent by user equipment, the base station control method provided by this embodiment further includes the following steps:

S111. The base station sends state information to a neighboring base station, so that the neighboring base station sends the state information to user equipment served by the neighboring base station.

The state information is used to indicate the radio resource corresponding to the sending pattern and the radio resource corresponding to the receiving pattern.

Optionally, the state information is used to indicate that the sending pattern has a correspondence with the receiving pattern, and the state information is used to indicate the radio resource corresponding to the sending pattern or the radio resource corresponding to the receiving pattern. The state information includes a time association relationship between the power-saving transmitting state of the base station and the power-saving receiving state of the base station, a receiving working frequency of the base station, and a transmitting working frequency of the base station. Alternatively, in another optional implementation manner, the state information includes a receiving working frequency of the base station and a transmitting working frequency of the base station; and a time association relationship between the power-saving transmitting state of the base station and the power-saving receiving state of the base station is preset in the user equipment by using a protocol. For example, the protocol may specify that a receiving time point of the power-saving receiving state of the base station is several milliseconds after the base station sends a wireless access point identity, and therefore, the user equipment may send an activation signal several milliseconds later after the base station sends the wireless access point identity.

Optionally, the state information is used to indicate that the radio resource corresponding to the transmitting pattern is a first periodic time period on a first frequency, and that the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period. Specifically, as shown in FIG. 2b, in this embodiment, the power-saving state of the base station includes the power-saving transmitting state and the power-saving receiving state. The power-saving receiving state of the base station is that the base station performs reception intermittently according to a preset time. Starting from a start time point, reception may be performed intermittently according to a time interval T1. For example, using a position of a subframe 0 of a radio frame whose frame number is 0 as a start time point, reception is performed once every 200 milliseconds; or reception is performed at a preset time point, for example, reception is performed on a subframe 1 of each radio frame, or reception is performed on a subframe 1 and a subframe 6 of each radio frame whose frame number is an integer multiple of 4, or the like. In the several examples, the user equipment needs to first determine a timing of the base station, and specifically may determine a current subframe according to the wireless access point identity transmitted by the base station; or timings of the base station and the neighboring base station are synchronous, and the user equipment determines the timing of the base station by determining the timing of the neighboring base station. A timing relationship of the neighboring base station and a timing relationship of the base station are synchronous, or a fixed offset exists therebetween, and therefore the user equipment may know the timing relationship of the base station after acquiring the state information sent by the neighboring base station.

The power-saving transmitting state is that the base station performs transmission intermittently according to a time interval T2, and the time association relationship between the power-saving transmitting state of the base station and the power-saving receiving state of the base station is a time interval T3 shown in FIG. 2b, that is, a time difference T3 between previous signal transmission and current signal reception.

In this embodiment, the user equipment may acquire, in multiple manners, configuration information including the time association relationship between the power-saving transmitting state of the base station and the power-saving receiving state of the base station, the receiving working frequency of the base station, and the transmitting working frequency of the base station. The neighboring base station may acquire the configuration information from a network management system, or acquire the configuration information from the base station through a signaling interface between the base station and the neighboring base station, or the neighboring base station determines the configuration information by itself. For a specific implementation form, reference may be made to the manner of acquiring the configuration information of the power-saving state or related configuration information in the first embodiment, which is not described again herein.

Optionally, the sending pattern and/or the receiving pattern is prestored, or the sending pattern and/or the receiving pattern is configured by the neighboring base station, or the sending pattern and/or the receiving pattern is acquired from a network management device.

Optionally, the base station sends the state information to the neighboring base station through the signaling interface, so that the neighboring base station sends the state information to the user equipment served by the neighboring base station. Optionally, the power-saving receiving state of the base station may specifically be configured according to configuration information of a discontinuous receiving radio resource, so that the base station receives a signal on the discontinuous receiving radio resource. The power-saving receiving state of the base station may be configured according to at least configuration information of a physical resource block (Physical Resource Block, PRB) configuration or a subframe configuration. Optionally, the power-saving transmitting state of the base station may specifically be configured according to configuration information of a discontinuous transmitting radio resource. The power-saving transmitting state of the base station may be configured according to at least configuration information of a physical resource block (Physical Resource Block, PRB) configuration or a subframe configuration.

Optionally, regardless of whether the base station acquires the configuration information from the network management system or acquires the configuration information from the neighboring serving base station, or the neighboring base station serving the user equipment acquires the configuration information from the base station or the network management system, configuration information of base stations having a same working frequency may be defined to be the same, or configuration information of base stations may be defined to be different. A specific manner of defining the configuration information is not limited in this embodiment.

S112. The base station sends a wireless access point identity on a radio resource corresponding to a sending pattern.

Optionally, the base station may send the wireless access point identity on a radio resource corresponding to a power-saving transmitting pattern on the transmitting working frequency of the base station to the user equipment, so that the user equipment receives the wireless access point identity on the radio resource of the transmitting working frequency of the base station, where the wireless access point identity is used to instruct the user equipment to send the activation signal to the base station on a radio resource corresponding to a power-saving receiving pattern on the receiving working frequency of the base station. The wireless access point identity is used to identify an identity of the base station to instruct the user equipment to acquire a time point of sending the activation signal, so that the user equipment sends the activation signal to the base station at the time point of sending the activation signal, on the radio resource corresponding to the power-saving receiving pattern on the receiving working frequency of the base station corresponding to the wireless access point identity. A specific instruction process is described as follows:

A purpose of sending the wireless access point identity is to cause the user equipment to obtain, according to a transmitting time point of sending the wireless access point identity and the time association relationship between the power-saving transmitting state of the base station and the power-saving receiving state of the base station, the time point of sending the activation signal, so that the user equipment sends the activation signal to the base station according to the obtained time point of sending the activation signal, on the radio resource corresponding to the power-saving receiving pattern on the receiving working frequency of the base station.

In this embodiment, the time association relationship between the power-saving transmitting state of the base station and the power-saving receiving state of the base station is the time interval T3 shown in FIG. 2b, that is, the time difference T3 between previous signal transmission by the base station and current reception of the activation signal by the base station. Therefore, the time point of sending the activation signal is a sum of the transmitting time point of sending the wireless access point identity and the time interval T3, that is, the base station may receive the activation signal at this time point, and then leave the power-saving state. In a communications system, a communication time interval between the time point of sending the wireless access point identity by the base station and the time point of receiving the wireless access point identity by the user equipment may be ignored. Therefore, the user equipment may obtain, through calculation according to the time of receiving the signal transmitted by the base station and the time interval T3, that the time point of sending the activation signal by the user equipment is the sum of the time point of receiving the wireless access point identity and the time interval T3.

In this embodiment, a base station receives, on a radio resource corresponding to a power-saving receiving pattern on a receiving working frequency of the base station, an activation signal sent by user equipment, so that the base station controls itself to leave a power-saving state. Therefore, the user equipment may directly send the activation signal to the base station to switch a working state of the base station from the power-saving state to a normal communication state as soon as possible. In this manner, a power-saving objective of the base station is achieved, and switching of the base station from the power-saving state to the normal communication state as soon as possible can also be accelerated on a basis of achieving power saving of the base station, so that services may be provided for the user equipment as soon as possible.

In this embodiment, specifically, the base station sends a wireless access point identity, so that the user equipment may obtain, through calculation according to a time interval T3 between previous signal transmission by the base station and current signal reception by the base station, that a time point of sending the activation signal by the user equipment is a sum of a time point of receiving the wireless access point identity and the time interval T3. Therefore, the user equipment sends the activation signal according to the acquired time point of transmitting the activation signal. This may achieve a basically same technical effect as the base station control method provided by the first embodiment, and an objective thereof is also to cause the base station to quickly leave the power-saving state.

The wireless access point identity is used to identify the identity of the base station.

In an optional implementation manner, the wireless access point identity may specifically be at least one of a physical cell identity (Physical Cell Identity, PCI), a physical cell group identity, a sounding reference signal (Sounding reference signals, SRS), or a channel status indication reference signal (Channel status indication reference signal, CSI-RS), which may be combined freely, and a combination form is not limited in this embodiment.

In an optional implementation manner, the state information further includes indication information, where the indication information is used to indicate that the base station is in one of the following states:

the base station is in the power-saving receiving state;

the base station is in the power-saving transmitting state;

the base station is in the power-saving receiving state and a normal transmitting state;

the base station is in the power-saving transmitting state and the power-saving receiving state;

the base station is in a normal receiving state and the normal transmitting state;

the base station is in the normal receiving state and the power-saving transmitting state;

the base station is in the power-saving state; and the base station is in a non-power-saving state, so that the user equipment determines whether to send the activation signal to the base station to cause the base station in the power-saving state to leave the power-saving state.

In an optional implementation manner, after step S130 shown in FIG. 1a or FIG. 2a is performed, that is, after the base station leaves the power-saving state, the method further includes:

the base station indicates, to the neighboring base station through a communications interface with the neighboring base station, that the base station leaves the power-saving state.

The following is a base station control method provided by a third embodiment of the present invention, where steps performed in the base station control method provided by the third embodiment of the present invention are described from a perspective of user equipment.

The base station control method provided by the third embodiment of the present invention includes:

A. User equipment determines a receiving pattern that is used when a base station receives a signal in a power-saving state, where the power-saving state includes at least a power-saving receiving state, where the power-saving receiving state is that the base station receives the signal on a radio resource corresponding to the receiving pattern, and the radio resource corresponding to the receiving pattern is a part of all radio resources supported by the base station.

Optionally, the radio resource corresponding to the receiving pattern is one or a combination of the following:

some frequencies in all frequencies supported by the base station;

some subframes in all subframes; and some code resources in all code resources supported by the base station.

Figure 3A:
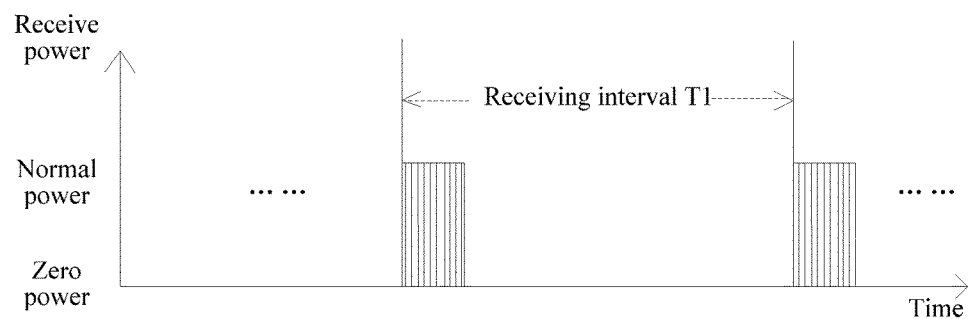
FIG. 3a is an exemplary diagram of a power-saving receiving pattern of a base station according to a third embodiment of the present invention.
Figure 3B:
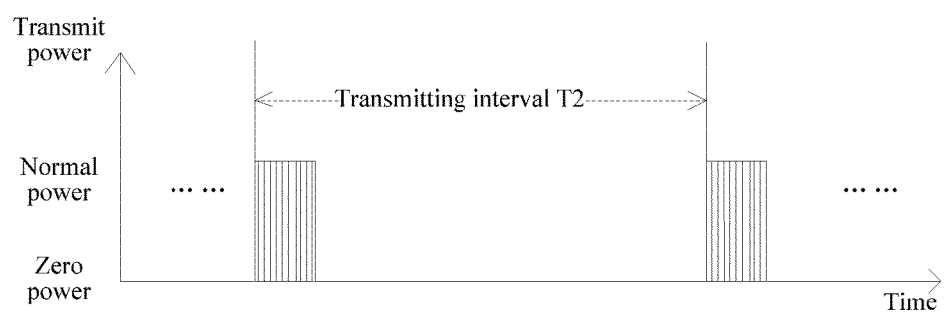
FIG. 3b is an exemplary diagram of a power-saving transmitting pattern of the base station according to the third embodiment of the present invention.
Figure 3C:
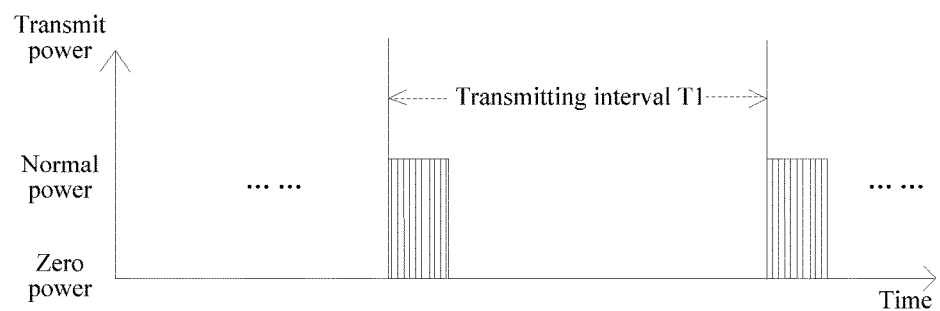
FIG. 3c is an exemplary diagram of a transmitting pattern of user equipment according to the third embodiment of the present invention.

Optionally, the power-saving receiving state is that the base station performs reception intermittently according to a preset time, and the user equipment may send an activation signal to the base station on a radio resource corresponding to a power-saving receiving pattern on a receiving working frequency of the base station, so that the base station leaves the power-saving state. Referring to FIG. 3a to FIG. 3c, FIG. 3a is an exemplary diagram of the power-saving receiving pattern of the base station according to the third embodiment of the present invention, FIG. 3b is an exemplary diagram of a power-saving transmitting pattern of the base station according to the third embodiment of the present invention, and FIG. 3c is an exemplary diagram of a transmitting pattern of the user equipment according to the third embodiment of the present invention. As shown in FIG. 3a, in this embodiment, the power-saving receiving state of the base station is that the base station receives the signal on the radio resource corresponding to the receiving pattern, and the radio resource corresponding to the receiving pattern is a part of all radio resources supported by the base station. Specifically, starting from a start time point, reception may be performed intermittently according to a time interval T1. That is, the power-saving receiving state of the base station may be configured according to configuration information of a discontinuous receiving radio resource, so that the base station receives the signal on the discontinuous receiving radio resource. The power-saving receiving state of the base station may be configured according to at least configuration information of a physical resource block (Physical Resource Block, PRB) configuration or a subframe configuration.

The power-saving state of the base station may further include a power-saving transmitting state of the base station, where the power-saving transmitting state is that the base station sends a signal on a radio resource corresponding to a sending pattern, and the radio resource corresponding to the sending pattern is a part of all radio resources supported by the base station. Specifically, the power-saving transmitting state of the base station may include a state in which the base station is in a non-transmitting communication mode or a state in which the base station performs transmission intermittently according to a preset time. Specifically, the power-saving transmitting state of the base station may be configured according to configuration information of a discontinuous transmitting radio resource. The power-saving transmitting state of the base station may be configured according to at least configuration information of a physical resource block (Physical Resource Block, PRB) configuration or a subframe configuration. As shown in FIG. 3b, the power-saving transmitting state of the base station in this embodiment is that the base station performs transmission intermittently according to a time interval T2. In other embodiments, power-saving states of the base station may be combined freely, but implementation steps of the base station control method are the same as steps of this embodiment in which the base station includes the power-saving receiving state and the power-saving transmitting state of intermittent transmission according to the time interval T2, and a same effect can be achieved, that is, the base station is caused to switch from the power-saving state to a normal communication state and power consumption of the base station is further reduced.

B. The user equipment sends an activation signal on the radio resource corresponding to the receiving pattern, where the activation signal is used to instruct the base station to leave the power-saving state.

Optionally, as shown in FIG. 3c, the user equipment in this embodiment may send the activation signal to the base station on the radio resource corresponding to the power-saving receiving pattern on the receiving working frequency of the base station to activate the base station, so that the base station leaves the power-saving state. That is, the activation signal sent by the user equipment is an activation signal transmitted intermittently according to a preset time. After the base station is activated, a communications link is established with the base station, and service communication is performed. Specifically, one activation signal may be transmitted, or the user equipment may transmit the activation signal to the base station intermittently according to the preset time, namely, the time interval T1, on the radio resource corresponding to the power-saving receiving pattern of the base station, or may transmit the activation signal to the base station on several radio resources corresponding to the power-saving receiving pattern of the base station to activate the base station in the power-saving state, so that the base station leaves the power-saving state and switches to the normal communication state. That is, a transmitting working frequency of the user equipment is the same as the receiving working frequency of the base station.

In the base station control method provided by this embodiment, user equipment sends an activation signal to a base station on a radio resource corresponding to a power-saving receiving pattern of the base station, so that the base station leaves a power-saving state. That is, the activation signal is directly sent to the base station, so that a working state of the base station is switched from the power-saving state to a normal communication state as soon as possible. In this manner, a power-saving objective of the base station is achieved, and switching of the base station from the power-saving state to the normal communication state as soon as possible can also be accelerated on a basis of achieving power saving of the base station, so that a communications link is established with the base station as soon as possible to complete service processing.

In an optional implementation manner, step A, that is, "User equipment determines a receiving pattern that is used when a base station receives a signal in a power-saving state", includes:

a1. Receive configuration information sent by a neighboring base station serving the user equipment, where the configuration information includes state information used to indicate the receiving pattern of the base station.

Optionally, the configuration information further includes at least one piece of time synchronization information, power-saving state start indication information, and a cell identity, where the time synchronization information is used to indicate a relationship between time synchronization of the base station and time synchronization of the neighboring base station, the power-saving state start indication information is used to indicate whether the base station is in the power-saving receiving state, and the cell identity is used to identify a cell controlled by the base station.

Optionally, the power-saving receiving state of the base station is that the base station performs reception intermittently according to a preset time, and the configuration information includes the power-saving receiving state of the base station and the receiving working frequency of the base station. As shown in FIG. 3a, specifically, starting from a start time point, the base station may perform reception intermittently according to the time interval T1. For example, using a position of a subframe 0 of a radio frame whose frame number is 0 as a start time point, reception is performed once every 200 milliseconds; or reception is performed at a preset time point, for example, reception is performed on a subframe 1 of each radio frame, or reception is performed on a subframe 1 and a subframe 6 of each radio frame whose frame number is an integer multiple of 4, or the like. In the two examples, the user equipment needs to first determine a timing of the base station, and specifically may determine a current subframe according to a wireless access point identity transmitted by the base station; or timings of the base station and the neighboring base station serving the user equipment are synchronous, and the user equipment determines the timing of the base station by determining the timing of the neighboring base station serving the user equipment. A timing relationship of the neighboring base station serving the user equipment and a timing relationship of the base station are synchronous, or a fixed offset exists therebetween, and therefore the user equipment may know the timing relationship of the base station after acquiring the configuration information sent by the neighboring base station serving the user equipment.

As shown in FIG. 3b, the base station performs transmission intermittently according to the time interval T2. The user equipment acquires the receiving working frequency and power-saving receiving state of the base station according to the configuration information, and determines that the base station may intermittently receive, according to the preset time, namely, according to the time interval T1, the activation signal on the radio resource corresponding to the power-saving receiving pattern on the receiving working frequency. Therefore, as shown in FIG. 3c, the user equipment intermittently transmits the activation signal to the base station at the preset time, namely, the time interval T1, on the radio resource corresponding to the power-saving receiving pattern of the base station, or may transmit the activation signal to the base station on several radio resources corresponding to the power-saving receiving pattern of the base station to activate the base station in the power-saving state, so that the base station leaves the power-saving state and switches to the normal communication state. That is, the transmitting working frequency of the user equipment is the same as the receiving working frequency of the base station. Optionally, the user equipment may send one activation signal or a limited number of activation signals. The configuration information further includes at least one start time point, where the start time point may be relative or fixedly unchanged. That is, when the base station enters the power-saving state, from the at least one start time point, the base station receives the activation signal on the receiving working frequency of the base station according to at least one time interval. Therefore, the user equipment may obtain, through calculation according to the configuration information, a time point of sending the activation signal, so that the activation signal is accurately sent to the base station to activate the base station.

b1. Determine the receiving pattern of the base station according to the configuration information.

In an optional implementation manner, step A, that is, "User equipment determines a receiving pattern that is used when a base station receives a signal in a power-saving state", includes:

a2. The user equipment receives a wireless access point identity that is sent by the base station in a power-saving transmitting state included by the power-saving state, where the wireless access point identity is used to identify the base station, the power-saving transmitting state is that the base station sends a signal on a radio resource corresponding to a sending pattern, and the radio resource corresponding to the sending pattern is a part of all radio resources supported by the base station.

b2. The user equipment determines, according to the wireless access point identity, the receiving pattern that is used when the base station receives the signal in the power-saving state.

Optionally, before step a2, that is, before the user equipment receives the wireless access point identity, the method further includes:

the user equipment receives configuration information sent by the neighboring base station, where the configuration information includes state information used to indicate the sending pattern of the base station; and that the user equipment receives a wireless access point identity that is sent by the base station in a power-saving transmitting state included by the power-saving state includes:

the user equipment receives, according to the transmitting pattern, the wireless access point identity that is sent by the base station in the power-saving transmitting state included by the power-saving state of the base station.

Optionally, the configuration information further includes at least one piece of time synchronization information, power-saving state start indication information, and a cell identity, where the time synchronization information is used to indicate a relationship between time synchronization of the base station and time synchronization of the neighboring base station, the power-saving state start indication information is used to indicate whether the base station is in the power-saving receiving state, and the cell identity is used to identify a cell controlled by the base station.

Optionally, step b2, that is, "The user equipment determines, according to the wireless access point identity, the receiving pattern that is used when the base station receives the signal in the power-saving state", includes:

the user equipment obtains, according to a time point of receiving the wireless access point identity and a correspondence between the sending pattern and the receiving pattern of the base station, a time point of sending the activation signal; and that the user equipment sends an activation signal on the radio resource corresponding to the receiving pattern includes:

the user equipment sends the activation signal at the time point of sending the activation signal, where the correspondence between the sending pattern and the receiving pattern is prestored or is notified by the neighboring base station.

In this embodiment, the configuration information sent by the neighboring base station serving the user equipment may be acquired from the base station, or may be acquired from a network management system, or may be configuration information that is determined by the neighboring base station serving the user equipment. Optionally, regardless of whether the base station acquires the configuration information from the network management system or acquires the configuration information from the neighboring serving base station, or the neighboring base station serving the user equipment acquires the configuration information from the base station or the network management system, configuration information of base stations having a same working frequency may be defined to be the same, or configuration information of base stations may be defined to be different. A specific manner of defining the configuration information is not limited in this embodiment.

In an optional implementation manner, the configuration information further includes a transmitting state of the base station and a transmitting working frequency of the base station. Therefore, after the power-saving receiving state of the base station is acquired according to the configuration information, and before the user equipment sends the activation signal to the base station on the radio resource corresponding to the power-saving receiving pattern on the receiving working frequency of the base station, the method further includes:

acquiring the transmitting state of the base station and the transmitting working frequency of the base station according to the configuration information;

receiving the wireless access point identity sent by the base station on the radio resource corresponding to the transmitting pattern on the transmitting working frequency of the base station; and sending the activation signal to the base station on the radio resource corresponding to the power-saving receiving pattern on the receiving working frequency of the base station corresponding to the wireless access point identity, where the wireless access point identity is used to identify the identity of the base station.

In an optional implementation manner, the wireless access point identity may specifically be a physical cell identity (Physical Cell Identity, PCI), a physical cell group identity, a sounding reference signal (Sounding reference signals, SRS), a synchronization signal, or a channel status indication reference signal (Channel status indication reference signal, CSI-RS).

In an optional implementation manner, the configuration information further includes indication information, where the indication information is used to indicate that the base station is in one of the following states:

the base station is in the power-saving receiving state;

the base station is in the power-saving transmitting state;

the base station is in the power-saving receiving state and a normal transmitting state;

the base station is in the power-saving transmitting state and the power-saving receiving state;

the base station is in a normal receiving state and the normal transmitting state;

the base station is in the normal receiving state and the power-saving transmitting state;

the base station is in the power-saving state; and the base station is in a non-power-saving state.

In an optional implementation manner, after step B, that is, after the user equipment sends the activation signal on the radio resource corresponding to the receiving pattern, the method further includes:

receiving a notification that is sent by the base station and indicates that the base station leaves the power-saving state, where the notification indicating that the base station leaves the power-saving state includes at least one notification of a notification indicating that the base station leaves the power-saving receiving state or a notification indicating that the base station leaves the power-saving transmitting state.

Figure 4A:
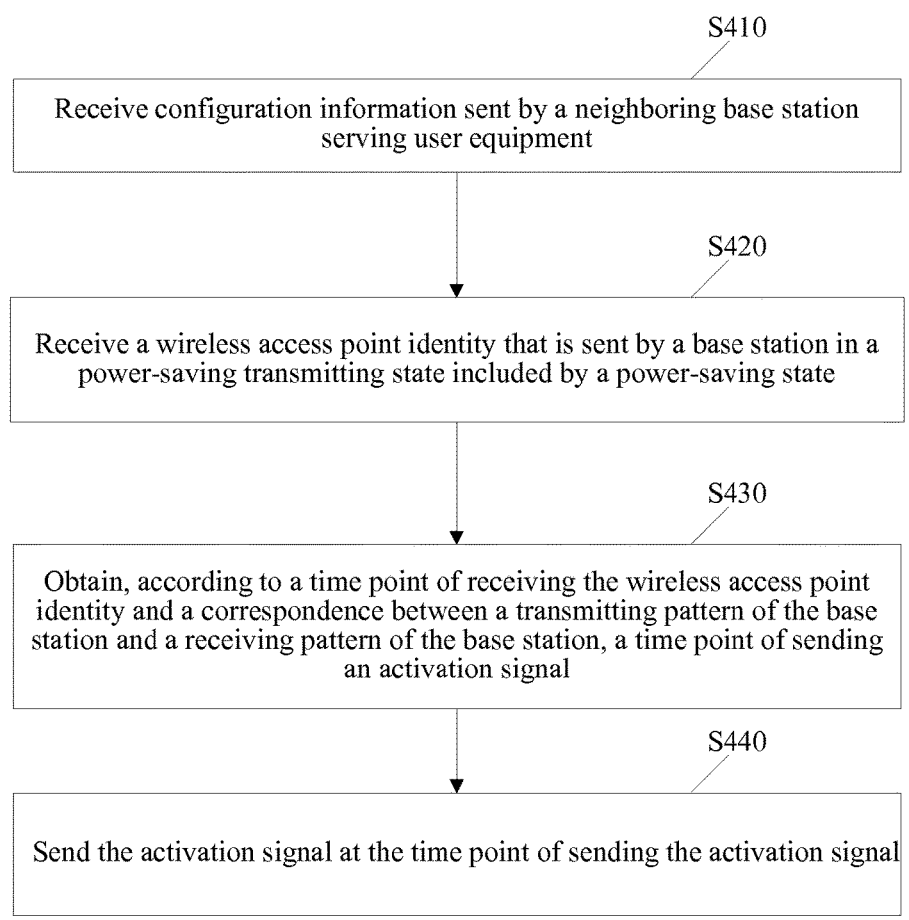
FIG. 4a is a flowchart of a base station control method according to a fourth embodiment of the present invention.
Figure 4B:
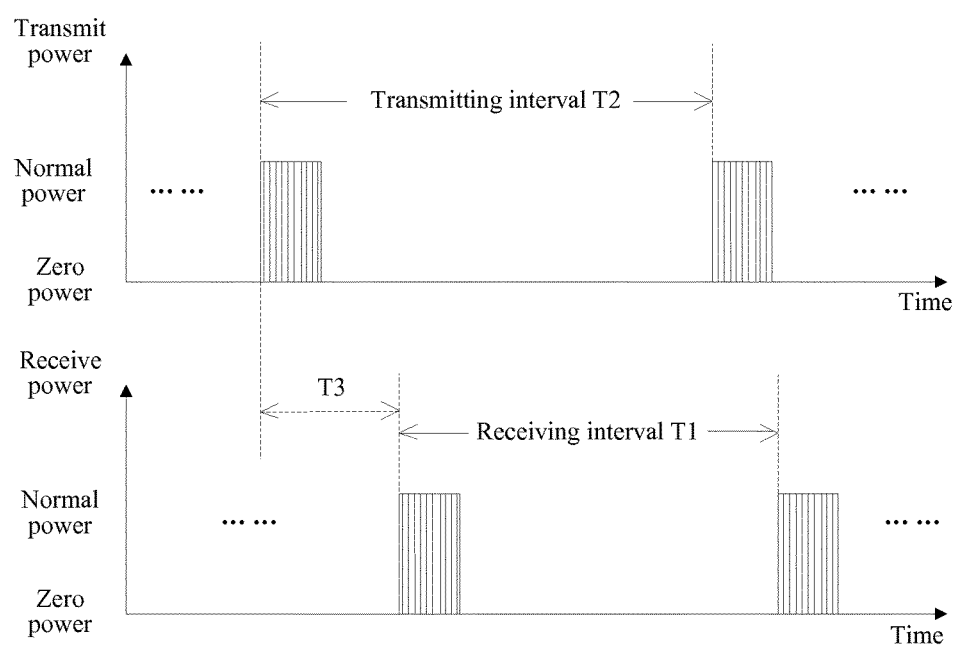
FIG. 4b is a schematic diagram of a time association relationship between a power-saving transmitting pattern of a base station and a power-saving receiving pattern of the base station according to the fourth embodiment of the present invention.

Referring to FIG. 4a and FIG. 4b, FIG. 4a is a flowchart of a base station control method according to a fourth embodiment of the present invention, and FIG. 4b is a schematic diagram of a time association relationship between a power-saving transmitting pattern of a base station and a power-saving receiving pattern of the base station according to the fourth embodiment of the present invention.

The base station control method provided by this embodiment is also described from a perspective of user equipment. Referring to FIG. 4b, a power-saving state of the base station in this embodiment includes a power-saving receiving state and a power-saving transmitting state.

The power-saving receiving state of the base station is that the base station receives a signal on a radio resource corresponding to a receiving pattern, and the radio resource corresponding to the receiving pattern is a part of all radio resources supported by the base station. Optionally, the power-saving receiving state of the base station is that the base station performs reception intermittently on a receiving working frequency of the base station according to a preset time. The power-saving receiving state of the base station may be configured according to configuration information of a discontinuous receiving radio resource, so that the base station receives the signal on the discontinuous receiving radio resource, or the power-saving receiving state of the base station may be configured according to at least configuration information of a physical resource block (Physical Resource Block, PRB) configuration or a subframe configuration. Specifically, starting from a start time point, the base station may perform reception intermittently on the receiving working frequency according to a time interval T1. For example, using a position of a subframe 0 of a radio frame whose frame number is 0 as a start time point, reception is performed once every 200 milliseconds; or reception is performed at a preset time point, for example, reception is performed on a subframe 1 of each radio frame, or reception is performed on a subframe 1 and a subframe 6 of each radio frame whose frame number is an integer multiple of 4, or the like. In the two examples, the user equipment needs to first determine a timing of the base station, and specifically may determine a current subframe according to a wireless access point identity transmitted by the base station; or timings of the base station and a neighboring base station serving the user equipment are synchronous, and the user equipment determines the timing of the base station by determining the timing of the neighboring base station serving the user equipment. A timing relationship of the neighboring base station serving the user equipment and a timing relationship of the base station are synchronous, or a fixed offset exists therebetween, and therefore the user equipment may know the timing relationship of the base station after acquiring the configuration information sent by the neighboring base station serving the user equipment.

The power-saving transmitting state of the base station is that the base station sends a signal on a radio resource corresponding to a sending pattern, and the radio resource corresponding to the sending pattern is a part of all radio resources supported by the base station. Optionally, the power-saving transmitting state of the base station is that the base station performs transmission intermittently on a transmitting working frequency according to a preset time. Specifically, the base station may perform transmission intermittently on the transmitting working frequency according to a time interval T2. Specifically, the base station may configure the power-saving transmitting state of the base station according to configuration information of a discontinuous transmitting radio resource, or may configure the power-saving transmitting state of the base station according to at least configuration information of a physical resource block (Physical Resource Block, PRB) configuration or a subframe configuration.

The base station control method provided by this embodiment includes:

S410. Receive configuration information sent by a neighboring base station serving user equipment.

The configuration information includes a correspondence between a transmitting pattern of a base station and a receiving pattern of the base station, a receiving working frequency of the base station, and a transmitting working frequency of the base station.

Alternatively, in another optional implementation manner, the configuration information includes a receiving working frequency of a base station and a transmitting working frequency of the base station; and a correspondence between a transmitting pattern of the base station and a receiving pattern of the base station is preset in the user equipment by using a protocol.

For example, the protocol may specify that a receiving time point of the power-saving receiving state of the base station is several milliseconds after the base station sends a wireless access point identity, and therefore, the user equipment may send an activation signal several milliseconds later after the base station sends the wireless access point identity.

Referring to FIG. 4b, the power-saving transmitting state is that the base station performs transmission intermittently on the transmitting working frequency of the base station according to a time interval T2, and the power-saving receiving state is that the base station performs reception intermittently on the receiving working frequency according to a time interval T1. Therefore, a time association relationship between the power-saving transmitting state of the base station and the power-saving receiving state of the base station may be defined as a time interval T3 shown in FIG. 4b, that is, a time difference T3 between previous signal transmission and current signal reception.

In this embodiment, the user equipment may acquire, in multiple manners, the configuration information including the time association relationship between the power-saving transmitting state of the base station and the power-saving receiving state of the base station, the receiving working frequency of the base station, and the transmitting working frequency of the base station. The neighboring base station serving the user equipment may acquire the configuration information from a network management system, or acquire the configuration information from the base station through a signaling interface between the base station and the neighboring base station serving the user equipment, or the neighboring base station serving the user equipment determines the configuration information by itself. For a specific implementation form, reference may be made to the manner of acquiring the configuration information in the first embodiment, which is not described again herein. Optionally, regardless of whether the base station acquires the configuration information from the network management system or acquires the configuration information from the neighboring serving base station, or the neighboring base station serving the user equipment acquires the configuration information from the base station or the network management system, configuration information of base stations having a same working frequency may be defined to be the same, or configuration information of base stations may be defined to be different. A specific manner of defining the configuration information is not limited in this embodiment.

S420. Receive a wireless access point identity that is sent by a base station in a power-saving transmitting state included by a power-saving state. Specifically, the user equipment may receive, on a radio resource corresponding to a power-saving transmitting pattern on the transmitting working frequency of the base station, the wireless access point identity that is sent by the base station on the radio resource corresponding to the power-saving transmitting pattern on the transmitting working frequency of the base station. The wireless access point identity is used to identify the base station.

S430. Obtain, according to a time point of receiving the wireless access point identity and a correspondence between a transmitting pattern of the base station and a receiving pattern of the base station, a time point of sending an activation signal.

S440. Send the activation signal at the time point of sending the activation signal, where the correspondence between the sending pattern and the receiving pattern is prestored or is notified by the neighboring base station.

Optionally, in step S430, the time point of sending the activation signal is acquired, so that the user equipment may send the activation signal to the base station at the time point of sending the activation signal, on a radio resource corresponding to a power-saving receiving pattern on the receiving working frequency of the base station corresponding to the wireless access point identity.

Optionally, the wireless access point identity is at least one of a physical cell identity, a physical cell group identity, a sounding reference signal, a synchronization signal, or a channel status indication reference signal; and the wireless access point identity is used to identify an identity of the base station, and used to instruct the user equipment to acquire the time point of sending the activation signal, and used to instruct to send the activation signal to the base station on the radio resource corresponding to the power-saving receiving pattern on the receiving working frequency of the base station corresponding to the wireless access point identity.

After receiving the wireless access point identity, the user equipment may obtain, according to a transmitting time point of sending the wireless access point identity by the base station and the time association relationship between the power-saving transmitting state of the base station and the power-saving receiving state of the base station, the time point of sending the activation signal, so that the user equipment sends the activation signal to the base station according to the obtained time point of sending the activation signal, on the radio resource corresponding to the power-saving receiving pattern on the receiving working frequency of the base station.

In this embodiment, the time association relationship between the power-saving transmitting state of the base station and the power-saving receiving state of the base station is the time interval T3 shown in FIG. 4b, that is, the time difference T3 between previous signal transmission by the base station and current reception of the activation signal by the base station. Therefore, the time point of sending the activation signal by the user equipment is a sum of the transmitting time point of sending the wireless access point identity and the time interval T3, that is, the base station may receive the activation signal at this time point, and then leave the power-saving state. In a communications system, a communication time interval between the time point of sending the wireless access point identity by the base station and the time point of receiving the wireless access point identity by the user equipment may be ignored. Therefore, the user equipment may obtain, through calculation according to the time of receiving the signal transmitted by the base station and the time interval T3, that the time point of sending the activation signal by the user equipment is the sum of the time point of receiving the wireless access point identity and the time interval T3.

In this embodiment, a base station receives, on a radio resource corresponding to a power-saving receiving pattern on a receiving working frequency of the base station, an activation signal sent by user equipment, so that the base station controls itself to leave a power-saving state. Therefore, the user equipment may directly send the activation signal to the base station to switch a working state of the base station from the power-saving state to a normal communication state as soon as possible. In this manner, a power-saving objective of the base station is achieved, and switching of the base station from the power-saving state to the normal communication state as soon as possible can also be accelerated on a basis of achieving power saving of the base station, so that services may be provided for the user equipment as soon as possible.

In this embodiment, specifically, the user equipment receives a wireless access point identity sent by the base station, and may obtain, through calculation according to a time difference T3 between previous signal transmission and current signal reception by the base station, that a time point of sending an activation signal by the user equipment is a sum of a time point of receiving the wireless access point identity and the time interval T3, acquire the time point of sending the activation signal, and send the activation signal at this time point on a radio resource corresponding to a power-saving receiving state on a receiving working frequency of the base station, so that the base station quickly leaves the power-saving state.

In an optional implementation manner, the configuration information further includes indication information, where the indication information is used to indicate that the base station is in one of the following states:

the base station is in the power-saving receiving state;

the base station is in the power-saving transmitting state;

the base station is in the power-saving receiving state and a normal transmitting state;

the base station is in the power-saving transmitting state and the power-saving receiving state;

the base station is in a normal receiving state and the normal transmitting state;

the base station is in the normal receiving state and the power-saving transmitting state;

the base station is in the power-saving state; and the base station is in a non-power-saving state, so that the user equipment determines whether to send the activation signal to the base station to cause the base station in the power-saving state to leave the power-saving state.

In an optional implementation manner, after step S440 shown in FIG. 4a, that is, after the user equipment sends the activation signal at the time point of sending the activation signal, the method further includes:

receiving a notification that is sent by the base station and indicates that the base station leaves the power-saving state; and sending a service request to the base station, where the notification indicating that the base station leaves the power-saving state includes a notification indicating that the base station leaves the power-saving receiving state, or further includes a notification indicating that the base station leaves the power-saving transmitting state.

Figure 5A:
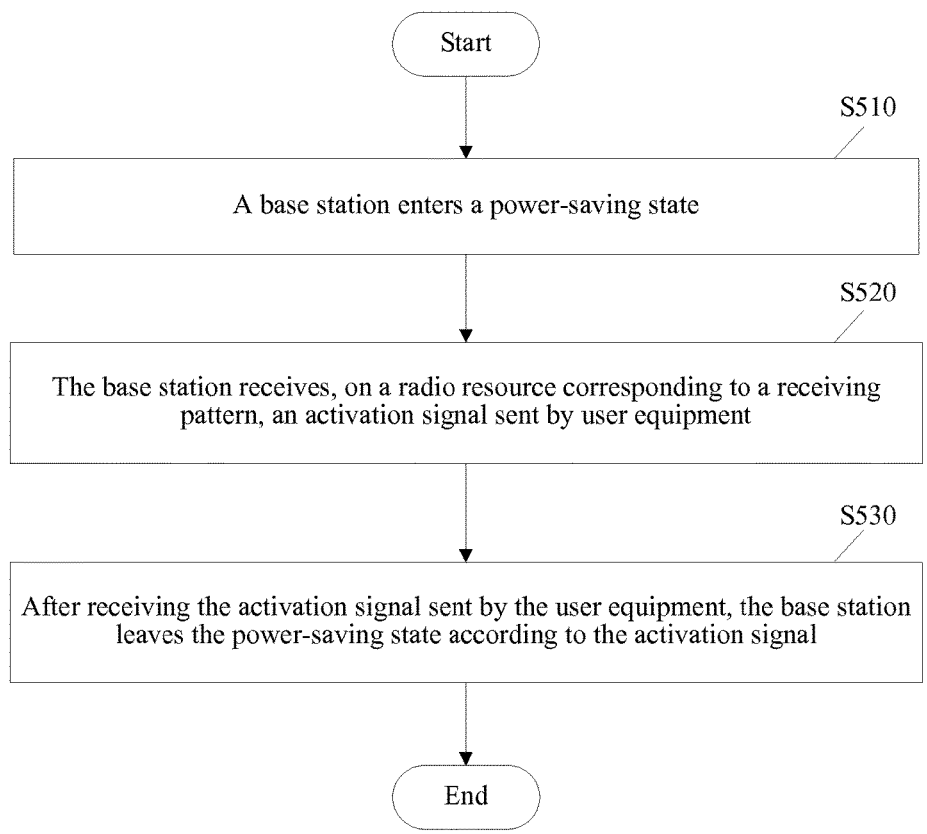
FIG. 5a is a flowchart of a base station control method according to a fifth embodiment of the present invention.
Figure 5B:
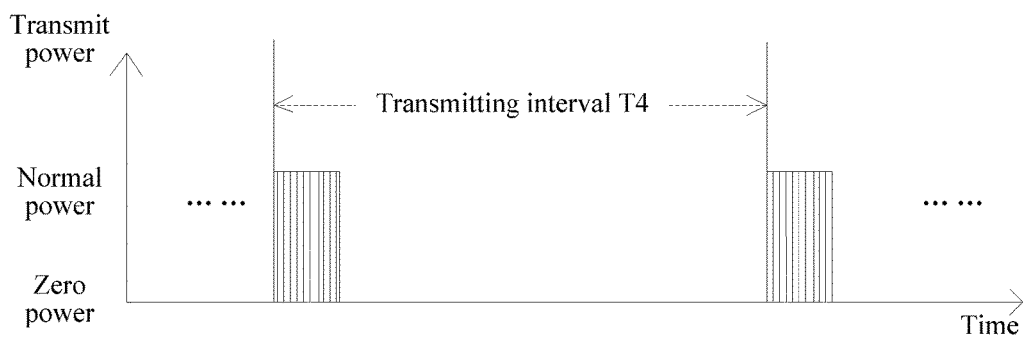
FIG. 5b is an exemplary diagram of a power-saving transmitting pattern of a base station according to the fifth embodiment of the present invention.
Figure 5C:
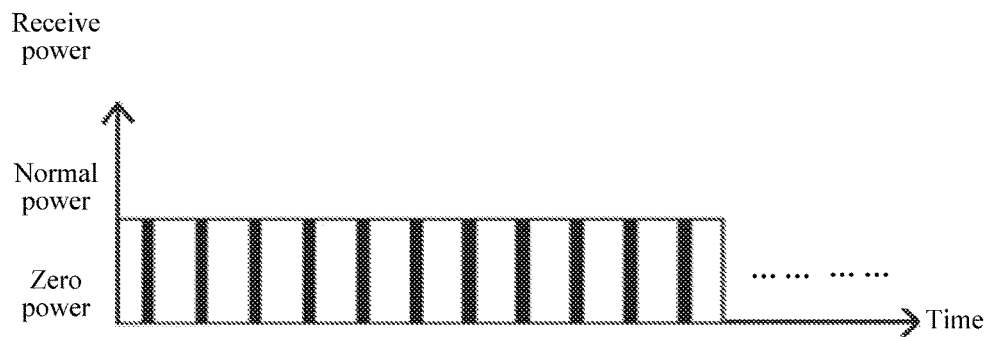
FIG. 5c is an exemplary diagram of a normal receiving pattern of the base station according to the fifth embodiment of the present invention.
Figure 5D:
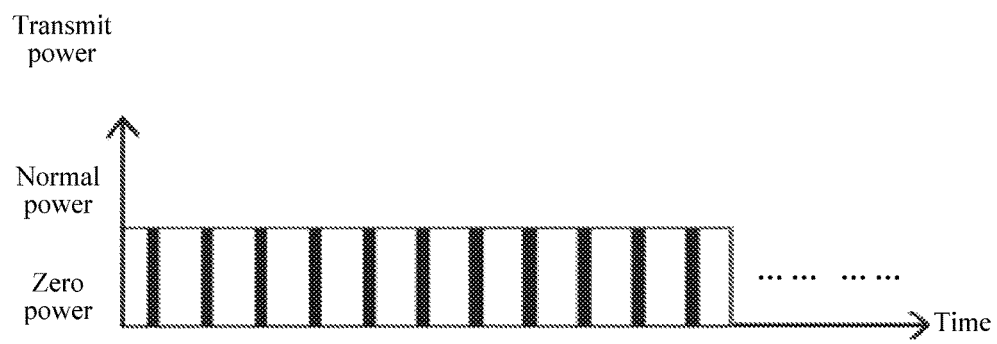
FIG. 5d is an exemplary diagram of a transmitting pattern of user equipment according to the fifth embodiment of the present invention.

Referring to FIG. 5a to FIG. 5d, FIG. 5a is a flowchart of a base station control method according to a fifth embodiment of the present invention; FIG. 5b is an exemplary diagram of a power-saving transmitting pattern of a base station according to the fifth embodiment of the present invention; FIG. 5c is an exemplary diagram of a normal receiving pattern of the base station according to the fifth embodiment of the present invention; and FIG. 5d is an exemplary diagram of a transmitting pattern of user equipment according to the fifth embodiment of the present invention. A procedure based on the base station control method shown in FIG. 5a is described from a perspective of a micro base station. As shown in FIG. 5a, the base station control method provided by this embodiment includes:

S510. A base station enters a power-saving state.

The power-saving state includes at least a power-saving transmitting state, where the power-saving transmitting state is that the base station sends a signal on a radio resource corresponding to a sending pattern, and the radio resource corresponding to the sending pattern is a part of all radio resources supported by the base station. Optionally, the power-saving transmitting state of the base station may be that the base station performs transmission intermittently according to a preset time. In this embodiment, the power-saving state of the base station includes only the power-saving transmitting state. That is, as shown in FIG. 5b, the base station performs transmission intermittently according to a preset time. The power-saving transmitting state of the base station may be configured according to configuration information of a discontinuous transmitting radio resource. The power-saving transmitting state of the base station may be configured according to at least configuration information of a physical resource block (Physical Resource Block, PRB) configuration or a subframe configuration. Specifically, transmission may be performed intermittently according to a time interval T4, and as shown in FIG. 5c, a receiving state of the base station is a normal receiving state.

In other embodiments, the power-saving state of the base station may further include a power-saving receiving state of the base station, where the power-saving receiving state is that the base station receives a signal on a radio resource corresponding to a receiving pattern, and the radio resource corresponding to the receiving pattern is a part of all radio resources supported by the base station. Optionally, the base station performs reception intermittently according to a time interval. The power-saving receiving state of the base station may be configured according to configuration information of a discontinuous receiving radio resource, so that the base station receives the signal on the discontinuous receiving radio resource. The power-saving receiving state of the base station may be configured according to at least configuration information of a physical resource block (Physical Resource Block, PRB) configuration or a subframe configuration.

S520. The base station receives, on a radio resource corresponding to a receiving pattern, an activation signal sent by user equipment. Optionally, the base station receives, on the radio resource corresponding to the receiving state on a receiving working frequency, the activation signal sent by the user equipment. The activation signal is a predefined known sequence, and specifically, may be a specific random access code. The known sequence is defined in a form of a protocol.

S530. After receiving the activation signal sent by the user equipment, the base station leaves the power-saving state according to the activation signal.

In the base station control method provided by this embodiment, a power-saving transmitting state of a base station is set, so that the base station receives, on a radio resource corresponding to a receiving state on a receiving working frequency of the base station, an activation signal sent by user equipment, so that the base station controls itself to leave a power-saving state. Therefore, the user equipment may directly send the activation signal to the base station to switch a working state of the base station from the power-saving state to a normal communication state as soon as possible. In this manner, a power-saving objective of the base station is achieved, and switching of the base station from the power-saving state to the normal communication state as soon as possible can also be accelerated on a basis of achieving power saving of the base station, so that services may be provided for the user equipment as soon as possible.

In an optional implementation manner, before the base station receives, on the radio resource corresponding to the receiving pattern, the activation signal sent by the user equipment, the method further includes:

the base station sends state information to a neighboring base station through a signaling interface, so that the neighboring base station sends the state information to the user equipment served by the neighboring base station, so that the user equipment knows the receiving pattern of the base station and that the user equipment sends the activation signal on the radio resource corresponding to the receiving pattern to the base station in the power-saving state.

Optionally, the state information includes the receiving pattern of the base station and the receiving working frequency of the base station. That is, as shown in FIG. 5c, the receiving state of the base station is the normal receiving state. Therefore, as shown in FIG. 5d, the user equipment sends, according to the receiving frequency of the base station, the activation signal on the radio resource corresponding to the normal receiving state on the receiving frequency of the base station. That is, a transmitting working frequency of the user equipment is the same as the receiving working frequency of the base station. In this embodiment, the user equipment may acquire, in multiple manners, the state information including the receiving state of the base station and the receiving working frequency of the base station. The neighboring base station may acquire the state information from a network management system, or acquire the state information from the base station through a signaling interface between the base station and the neighboring base station, or the neighboring base station determines the state information by itself. For a specific implementation form, reference may be made to the manner of acquiring the state information in the first embodiment, which is not described again herein.

Optionally, regardless of whether the base station acquires the state information from the network management system or acquires the state information from the neighboring serving base station, or the neighboring base station serving the user equipment acquires the state information from the base station or the network management system, state information of base stations having a same working frequency may be defined to be the same, or state information of base stations may be defined to be different. A specific manner of defining the state information is not limited in this embodiment.

In an optional implementation manner, the state information further includes a transmitting working frequency of the base station, and therefore, after the base station sends the state information to the neighboring base station through the signaling interface, the method further includes:

the base station sends a wireless access point identity on a radio resource corresponding to a power-saving transmitting pattern on the transmitting working frequency of the base station, so that after detecting the wireless access point identity, the user equipment sends the activation signal to the base station on the radio resource corresponding to the receiving state of the base station, where an identity signal includes at least an identity used to identify the base station.

In an optional implementation manner, the wireless access point identity may specifically be at least one of a physical cell identity (Physical Cell Identity, PCI), a physical cell group identity, a sounding reference signal (Sounding reference signals, SRS), or a channel status indication reference signal (Channel status indication reference signal, CSI-RS), which may be combined freely, and a combination form is not limited in this embodiment.

In an optional implementation manner, the state information further includes indication information, where the indication information is used to indicate that the base station is in the power-saving receiving state, or that the base station is in the power-saving transmitting state, or used to indicate that the base station is in the power-saving receiving state and a normal transmitting state, or used to indicate that the base station is in the power-saving transmitting state and the power-saving receiving state, or used to indicate that the base station is in the normal receiving state and the normal transmitting state, or used to indicate that the base station is in the normal receiving state and the power-saving transmitting state, or used to indicate that the base station is in the power-saving state, or used to indicate that the base station is in a non-power-saving state, so that the user equipment determines whether to send the activation signal to the base station to cause the base station in the power-saving state to leave the power-saving state.

In an optional implementation manner, after step S530 shown in FIG. 5a, the method further includes:

the base station indicates, to the neighboring base station through a communications interface with the neighboring base station, that the base station leaves the power-saving state.

A sixth embodiment of the present invention provides a wireless access point control method, where the method is described from a perspective of a wireless access point. The wireless access point control method includes:

a wireless access point enters a power-saving state, where the power-saving state includes at least one state of a power-saving transmitting state and a power-saving receiving state, where the power-saving receiving state is that the wireless access point receives a signal on a radio resource corresponding to a receiving pattern, the radio resource corresponding to the receiving pattern is a part of all radio resources supported by the wireless access point, the power-saving transmitting state is that the wireless access point sends a signal on a radio resource corresponding to a sending pattern, and the radio resource corresponding to the sending pattern is a part of all radio resources supported by the wireless access point; or optionally, the power-saving receiving state of the wireless access point is that the wireless access point performs reception intermittently according to a preset time, and the power-saving transmitting state is that the wireless access point performs transmission intermittently according to a preset time;

the access point sends first information to user equipment, so that the user equipment sends an activation signal to the wireless access point according to the first information to activate the wireless access point, where the first information is used to indicate that the wireless access point enters the power-saving state; and after receiving the activation signal, the wireless access point leaves the power-saving state.

A seventh embodiment of the present invention provides a wireless access point control method, where the method is described from a perspective of a wireless access point. The wireless access point control method includes:

a wireless access point enters a power-saving state, where the power-saving state includes at least one state of a power-saving transmitting state and a power-saving receiving state, where the power-saving receiving state is that the wireless access point receives a signal on a radio resource corresponding to a receiving pattern, the radio resource corresponding to the receiving pattern is a part of all radio resources supported by the wireless access point, the power-saving transmitting state is that the wireless access point sends a signal on a radio resource corresponding to a sending pattern, and the radio resource corresponding to the sending pattern is a part of all radio resources supported by the wireless access point; or optionally, the power-saving receiving state of the wireless access point is that the wireless access point performs reception intermittently according to a preset time, and the power-saving transmitting state is that the wireless access point performs transmission intermittently according to a preset time;

the wireless access point sends second information to a neighboring wireless access point, so that the neighboring wireless access point sends the second information to user equipment, so that the user equipment sends an activation signal to the wireless access point according to the second information to activate the wireless access point, where the second information is used to indicate that the wireless access point enters the power-saving state; and after receiving the activation signal, the wireless access point leaves the power-saving state.

An eighth embodiment of the present invention provides a wireless access point control method, where the method is described from a perspective of user equipment. The wireless access point control method includes:

receiving first information sent by a wireless access point, so as to send an activation signal to the wireless access point according to the first information to activate the wireless access point, so that the wireless access point leaves a power-saving state, where the first information is used to indicate that the wireless access point enters the power-saving state; and the power-saving state includes at least one state of a power-saving transmitting state and a power-saving receiving state, where the power-saving receiving state is that the wireless access point receives a signal on a radio resource corresponding to a receiving pattern, the radio resource corresponding to the receiving pattern is a part of all radio resources supported by the wireless access point, the power-saving transmitting state is that the wireless access point sends a signal on a radio resource corresponding to a sending pattern, and the radio resource corresponding to the sending pattern is a part of all radio resources supported by the wireless access point; or optionally, the power-saving receiving state of the wireless access point is that the wireless access point performs reception intermittently according to a preset time, and the power-saving transmitting state is that the wireless access point performs transmission intermittently according to a preset time.

A ninth embodiment of the present invention provides a wireless access point control method, where the method is described from a perspective of user equipment. The wireless access point control method includes:

receiving indication information sent by a neighboring wireless access point, so as to send an activation signal to a wireless access point according to the indication information to activate the wireless access point, so that the wireless access point leaves a power-saving state, where the indication information sent by the neighboring wireless access point is indication information sent by the wireless access point and received by the neighboring wireless access point, where the indication information is used to indicate that the wireless access point enters the power-saving state; and the power-saving state includes at least one state of a power-saving transmitting state and a power-saving receiving state, where the power-saving receiving state is that the wireless access point receives a signal on a radio resource corresponding to a receiving pattern, the radio resource corresponding to the receiving pattern is a part of all radio resources supported by the wireless access point, the power-saving transmitting state is that the wireless access point sends a signal on a radio resource corresponding to a sending pattern, and the radio resource corresponding to the sending pattern is a part of all radio resources supported by the wireless access point; or optionally, the power-saving receiving state of the wireless access point is that the wireless access point performs reception intermittently according to a preset time, and the power-saving transmitting state is that the wireless access point performs transmission intermittently according to a preset time.

Figure 6:
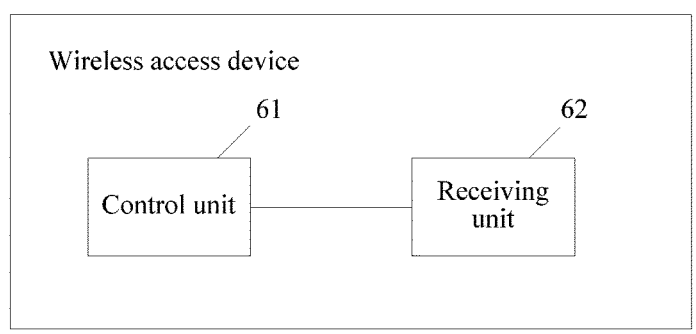
FIG. 6 is a structural diagram of a wireless access device according to an embodiment of the present invention.

Referring to FIG. 6, FIG. 6 is a structural diagram of a wireless access device according to an embodiment of the present invention. As shown in FIG. 6, the wireless access device provided by this embodiment includes a control unit 61 and a receiving unit 62.

The control unit 61 is configured to control a first wireless access point to enter a power-saving state, where the power-saving state includes at least a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point.

The receiving unit 62 is configured to receive, on the radio resource corresponding to the receiving pattern, an activation signal sent by user equipment.

The control unit 61 is further configured to control the first wireless access point to leave the power-saving state according to the activation signal.

In the wireless access device provided by this embodiment of the present invention, the receiving unit 62 receives, on a radio resource corresponding to a receiving pattern of a first wireless access point, an activation signal sent by user equipment, so that the control unit 62 controls the first wireless access point to leave a power-saving state according to the activation signal. Therefore, the user equipment may directly send the activation signal to the first wireless access point to switch a working state of the first wireless access point from the power-saving state to a normal communication state as soon as possible. In this manner, a power-saving objective of the wireless access point is achieved, and switching of the wireless access point from the power-saving state to the normal communication state as soon as possible can also be accelerated on a basis of achieving power saving of the wireless access point.

Further, the control unit 62 sets radio resources corresponding to different power-saving receiving patterns or power-saving transmitting patterns, to achieve a function of diversification of power-saving modes of a wireless access point, which can adapt to multiple environments in which a wireless access point is applied.

Optionally, in another embodiment, the wireless access device further includes a sending unit, configured to send state information to a second wireless access point, so that the second wireless access point sends the state information to the user equipment served by the second wireless access point, where the state information is used to indicate the radio resource corresponding to the receiving pattern. That is, the second wireless access point sends the state information to the user equipment, so that the user equipment determines the receiving pattern of the first wireless access point and may further send the activation signal to the first wireless access point, so that the first wireless access point leaves the power-saving state. Optionally, that the sending unit sends the state information to the second wireless access point may specifically be sending the state information through a signaling interface.

Optionally, the radio resource corresponding to the receiving pattern is one or a combination of the following:

some frequencies in all frequencies supported by the first wireless access point;

some subframes in all subframes; and some code resources in all code resources supported by the first wireless access point.

Optionally, in another embodiment, the power-saving state further includes a power-saving transmitting state, where the power-saving transmitting state is that the first wireless access point sends a signal on a radio resource corresponding to a sending pattern, and the radio resource corresponding to the sending pattern is a part of all radio resources supported by the first wireless access point.

The wireless access device further includes a sending unit, configured to send a wireless access point identity on the radio resource corresponding to the sending pattern, where the wireless access point identity is used to identify the first wireless access point.

Optionally, the wireless access point identity is at least one of a physical cell identity, a physical cell group identity, a sounding reference signal, a synchronization signal, and a channel status indication reference signal.

Optionally, the radio resource corresponding to the transmitting pattern is one or a combination of the following:

some frequencies in all frequencies supported by the first wireless access point;

some subframes in all subframes; and some code resources in all code resources supported by the first wireless access point.

Optionally, the sending unit is further configured to send state information to a second wireless access point, so that the second wireless access point sends the state information to the user equipment served by the second wireless access point, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

Optionally, the sending pattern and/or the receiving pattern is prestored, or the sending pattern and/or the receiving pattern is configured by the second wireless access point, or the sending pattern and/or the receiving pattern is acquired from a network management device.

Optionally, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

Optionally, the sending unit is further configured to send state information to a second wireless access point, so that the second wireless access point sends the state information to the user equipment served by the second wireless access point, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

Optionally, the sending pattern and/or the receiving pattern is prestored, or the sending pattern and/or the receiving pattern is configured by the second wireless access point, or the sending pattern and/or the receiving pattern is acquired from a network management device.

Optionally, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

In this embodiment, optionally, the wireless access device further includes a sending unit, configured to send a notification indicating that the first wireless access point leaves the power-saving state, to the second wireless access point; or configured to send a notification indicating that the first wireless access point leaves the power-saving state, to the user equipment, where the notification indicating that the first wireless access point leaves the power-saving state includes at least one notification of a notification indicating that the first wireless access point leaves the power-saving receiving state or a notification indicating that the first wireless access point leaves the power-saving transmitting state.

Figure 7:
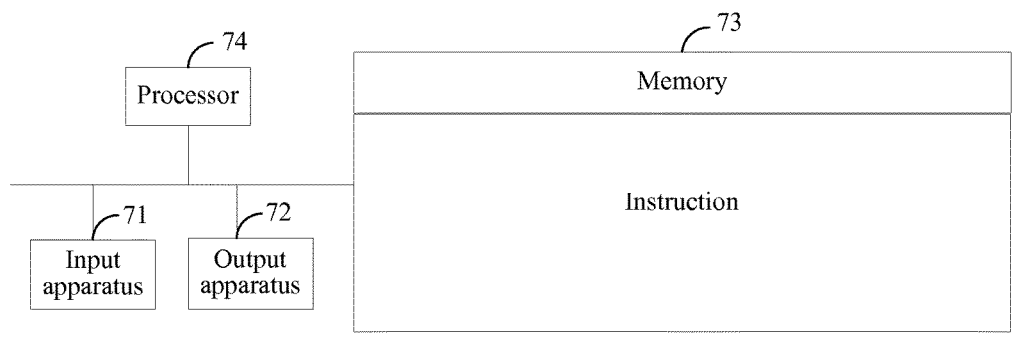
FIG. 7 is a structural diagram of another wireless access device according to an embodiment of the present invention.

Referring to FIG. 7, FIG. 7 is a structural diagram of another wireless access device according to an embodiment of the present invention. As shown in FIG. 7, the wireless access device provided by the embodiment of the present invention includes an input apparatus 71, an output apparatus 72, a memory 73, and a processor 74, where the memory 73 stores a set of program code, and the processor 74 is configured to invoke the program code stored in the memory 73 to execute the following operations:

controlling a first wireless access point to enter a power-saving state, where the power-saving state includes at least a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point;

receiving, on the radio resource corresponding to the receiving pattern, an activation signal sent by user equipment; and controlling the first wireless access point to leave the power-saving state according to the activation signal.

In this embodiment, the processor 74 executes related operations to specifically control a first wireless access point to enter a power-saving state and receive, on a radio resource corresponding to a receiving pattern, an activation signal sent by user equipment, so as to control the first wireless access point to leave the power-saving state according to the activation signal. Therefore, the user equipment may directly send the activation signal to the first wireless access point to switch a working state of the first wireless access point from the power-saving state to a normal communication state as soon as possible. In this manner, a power-saving objective of the wireless access point is achieved, and switching of the wireless access point from the power-saving state to the normal communication state as soon as possible can also be accelerated on a basis of achieving power saving of the wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, before executing the operation of receiving, on the radio resource indicated by the receiving pattern, an activation signal sent by user equipment, the processor is further configured to execute the following operation:

sending state information to a second wireless access point, so that the second wireless access point sends the state information to the user equipment served by the second wireless access point, where the state information is used to indicate the radio resource corresponding to the receiving pattern.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

Optionally, in another embodiment, the power-saving state further includes a power-saving transmitting state, where the power-saving transmitting state is that the first wireless access point sends a signal on a radio resource corresponding to a sending pattern, and the radio resource corresponding to the sending pattern is a part of all radio resources supported by the first wireless access point; and before executing the operation of receiving, by the first wireless access point, on the radio resource corresponding to the receiving pattern, an activation signal sent by user equipment, the processor is further configured to execute the following operation:

sending a wireless access point identity on the radio resource corresponding to the sending pattern, where the wireless access point identity is used to identify the first wireless access point.

Optionally, the wireless access point identity is at least one of a physical cell identity, a physical cell group identity, a sounding reference signal, a synchronization signal, and a channel status indication reference signal.

Optionally, the radio resource corresponding to the transmitting pattern is one or a combination of the following:

some frequencies in all frequencies supported by the first wireless access point;

some subframes in all subframes; and some code resources in all code resources supported by the first wireless access point.

Optionally, before executing the operation of sending, by the first wireless access point, a wireless access point identity on the radio resource corresponding to the sending pattern, the processor is further configured to execute the following operation:

sending state information to a second wireless access point, so that the second wireless access point sends the state information to the user equipment served by the second wireless access point, where the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

Optionally, the sending pattern and/or the receiving pattern is prestored, or the sending pattern and/or the receiving pattern is configured by the second wireless access point, or the sending pattern and/or the receiving pattern is acquired from a network management device.

Optionally, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

Optionally, after executing the operation of controlling the first wireless access point to leave the power-saving state according to the activation signal, the processor is further configured to execute the following operation:

sending a notification indicating that the first wireless access point leaves the power-saving state, to the second wireless access point; or sending, by the first wireless access point, a notification indicating that the first wireless access point leaves the power-saving state, to the user equipment, where the notification indicating that the first wireless access point leaves the power-saving state includes at least one notification of a notification indicating that the first wireless access point leaves the power-saving receiving state or a notification indicating that the first wireless access point leaves the power-saving transmitting state.

Figure 8:
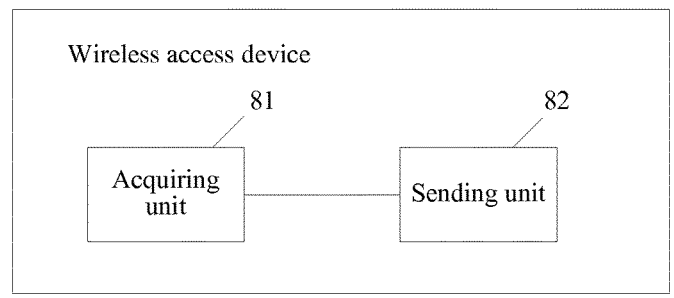
FIG. 8 is a structural diagram of another wireless access device according to an embodiment of the present invention.

Referring to FIG. 8, FIG. 8 is a structural diagram of another wireless access device according to an embodiment of the present invention. As shown in FIG. 8, the wireless access device provided by this embodiment serves user equipment. Specifically, the wireless access device provided by this embodiment includes an acquiring unit 81 and a sending unit 82.

The acquiring unit 81 is configured to acquire state information of a first wireless access point, where the state information is used to indicate a radio resource corresponding to a receiving pattern.

The sending unit 82 is configured to send the state information of the first wireless access point to user equipment, so that the first wireless access point receives, on the radio resource corresponding to the receiving pattern, an activation signal that is sent by the user equipment according to the state information, and leaves a power-saving state according to the activation signal, where the power-saving state includes a power-saving receiving state, where the power-saving receiving state is that the first wireless access point receives a signal on the radio resource corresponding to the receiving pattern, and the radio resource corresponding to the receiving pattern is a part of all radio resources supported by the first wireless access point.

The wireless access device provided by this embodiment may be disposed in a second wireless access point. In the wireless access device, the acquiring unit 81 acquires state information of a first wireless access point, where the state information is used to indicate a radio resource corresponding to a receiving pattern, so that the sending unit 82 sends the state information of the first wireless access point to user equipment, so that the first wireless access point directly receives, on the radio resource corresponding to the receiving pattern, an activation signal that is sent by the user equipment according to the state information, and leaves a power-saving state according to the activation signal. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

Optionally, in this embodiment, the state information further includes a wireless access point identity of the first wireless access point, where the wireless access point identity is used to identify the first wireless access point.

Optionally, in this embodiment, the wireless access point identity is at least one of a physical cell identity, a physical cell group identity, a sounding reference signal, a synchronization signal, and a channel status indication reference signal.

Optionally, in this embodiment, the state information further includes indication information, where the indication information is used to indicate that the first wireless access point is in one of the following states:

the first wireless access point is in the power-saving receiving state;

the first wireless access point is in a power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

Figure 9:
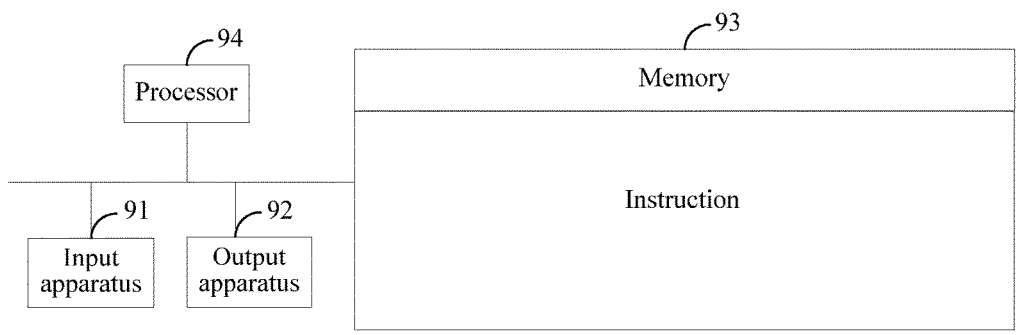
FIG. 9 is a structural diagram of another wireless access device according to an embodiment of the present invention.

Referring to FIG. 9, FIG. 9 is a structural diagram of another wireless access device according to an embodiment of the present invention. As shown in FIG. 9, the wireless access device provided by this embodiment includes an input apparatus 91, an output apparatus 92, a memory 93, and a processor 94, where the memory 93 stores a set of program code, and the processor 94 is configured to invoke the program code stored in the memory 93 to execute the following operations:

acquiring state information of a first wireless access point, where the state information is used to indicate a radio resource corresponding to a receiving pattern; and sending the state information of the first wireless access point to user equipment, so that the first wireless access point receives, on the radio resource corresponding to the receiving pattern, an activation signal that is sent by the user equipment according to the state information, and leaves a power-saving state according to the activation signal, where the power-saving state includes a power-saving receiving state, where the power-saving receiving state is that the first wireless access point receives a signal on the radio resource corresponding to the receiving pattern, and the radio resource corresponding to the receiving pattern is a part of all radio resources supported by the first wireless access point.

In this embodiment, the processor 94 executes related operations to specifically acquire state information of a first wireless access point, where the state information is used to indicate a radio resource corresponding to a receiving pattern, so as to send the state information of the first wireless access point to user equipment, so that the first wireless access point directly receives, on the radio resource corresponding to the receiving pattern, an activation signal that is sent by the user equipment according to the state information, and leaves a power-saving state according to the activation signal. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

Optionally, in this embodiment, the state information further includes a wireless access point identity of the first wireless access point, where the wireless access point identity is used to identify the first wireless access point. The wireless access point identity helps the user equipment to quickly match the first wireless access point and send the activation signal quickly and accurately to the first wireless access point identified by the wireless access point identity.

Optionally, in this embodiment, the wireless access point identity is at least one of a physical cell identity, a physical cell group identity, a sounding reference signal, a synchronization signal, and a channel status indication reference signal.

Optionally, in this embodiment, the state information further includes indication information, where the indication information is used to indicate that the first wireless access point is in one of the following states:

the first wireless access point is in the power-saving receiving state;

the first wireless access point is in a power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state. Multiple implementation manners of the indication information improve function expansion of the wireless access device, and further improve practicability of the wireless access device.

Figure 10:
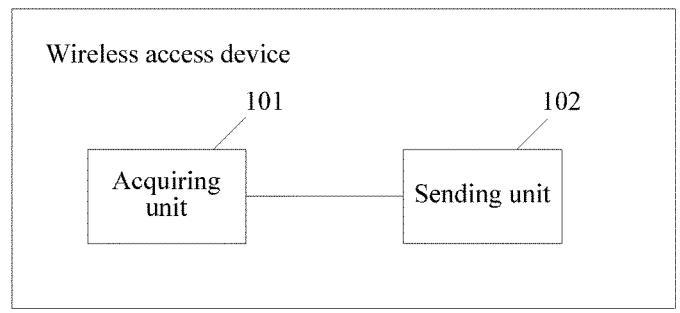
FIG. 10 is a structural diagram of another wireless access device according to an embodiment of the present invention.

Referring to FIG. 10, FIG. 10 is a structural diagram of another wireless access device according to an embodiment of the present invention. As shown in FIG. 10, the wireless access device provided by this embodiment includes an acquiring unit 101 and a sending unit 102.

The acquiring unit 101 is configured to acquire state information of a first wireless access point.

The sending unit 102 is configured to send the state information of the first wireless access point to user equipment, so that the first wireless access point sends a wireless access point identity on a radio resource corresponding to a sending pattern, so that the user equipment sends an activation signal to the first wireless access point identified by the wireless access point identity, so that the first wireless access point receives, on a radio resource corresponding to a receiving pattern, the activation signal sent by the user equipment, and controls the first wireless access point to leave a power-saving state according to the activation signal, where the wireless access point identity is used to identify the first wireless access point, and the power-saving state includes a power-saving receiving state and a power-saving transmitting state, where the power-saving receiving state is that the first wireless access point receives a signal on the radio resource corresponding to the receiving pattern, the radio resource corresponding to the receiving pattern is a part of all radio resources supported by the first wireless access point, the power-saving transmitting state is that the first wireless access point sends a signal on the radio resource corresponding to the sending pattern, the radio resource corresponding to the sending pattern is a part of all radio resources supported by the first wireless access point, and the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period.

In this embodiment, the acquiring unit 101 acquires state information of a first wireless access point, and further the sending unit 102 sends the state information of the first wireless access point to user equipment, so that the first wireless access point sends a wireless access point identity on a radio resource corresponding to a sending pattern, so that the user equipment sends an activation signal to the first wireless access point identified by the wireless access point identity, so that the first wireless access point directly receives, on a radio resource corresponding to a receiving pattern, the activation signal sent by the user equipment, and controls the first wireless access point to leave a power-saving state according to the activation signal. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the wireless access point identity is at least one of a physical cell identity, a physical cell group identity, a sounding reference signal, a synchronization signal, and a channel status indication reference signal.

Optionally, in this embodiment, the radio resource corresponding to the transmitting pattern is one or a combination of the following:

some frequencies in all frequencies supported by the first wireless access point;

some subframes in all subframes; and some code resources in all code resources supported by the first wireless access point.

Optionally, in this embodiment, the sending pattern and/or the receiving pattern is prestored, or the sending pattern and/or the receiving pattern is configured by a second wireless access point, or the sending pattern and/or the receiving pattern is acquired from a network management device.

Optionally, in this embodiment, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state. Multiple implementation manners of the indication information improve function expansion of the wireless access device, and further improve practicability of the wireless access device.

Figure 11:
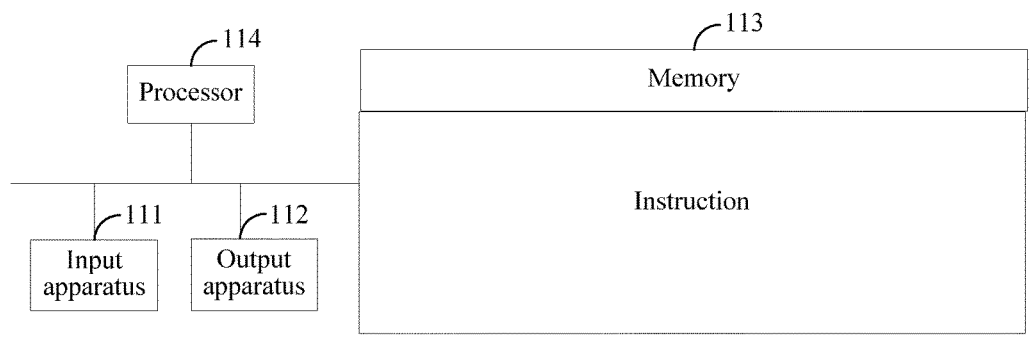
FIG. 11 is a structural diagram of another wireless access device according to an embodiment of the present invention.

Referring to FIG. 11, FIG. 11 is a structural diagram of another wireless access device according to an embodiment of the present invention. As shown in FIG. 11, the wireless access device provided by this embodiment includes an input apparatus 111, an output apparatus 112, a memory 113, and a processor 114, where the memory 113 stores a set of program code, and the processor 114 is configured to invoke the program code stored in the memory 113 to execute the following operations:

acquiring state information of a first wireless access point; and sending the state information of the first wireless access point to user equipment, so that the first wireless access point sends a wireless access point identity on a radio resource corresponding to a sending pattern, so that the user equipment sends an activation signal to the first wireless access point identified by the wireless access point identity, so that the first wireless access point receives, on a radio resource corresponding to a receiving pattern, the activation signal sent by the user equipment, and leaves a power-saving state according to the activation signal, where the wireless access point identity is used to identify the first wireless access point, and the power-saving state includes a power-saving receiving state and a power-saving transmitting state, where the power-saving receiving state is that the first wireless access point receives a signal on the radio resource corresponding to the receiving pattern, the radio resource corresponding to the receiving pattern is a part of all radio resources supported by the first wireless access point, the power-saving transmitting state is that the first wireless access point sends a signal on the radio resource corresponding to the sending pattern, the radio resource corresponding to the sending pattern is a part of all radio resources supported by the first wireless access point, and the state information is used to indicate the radio resource corresponding to the sending pattern and the radio resource corresponding to the receiving pattern; or the sending pattern has a correspondence with the receiving pattern, and the state information is used to indicate the radio resource corresponding to the sending pattern or the radio resource corresponding to the receiving pattern; or the radio resource corresponding to the transmitting pattern is a first periodic time period on a first frequency, and the radio resource corresponding to the receiving pattern is a second periodic time period on a second frequency, where the second frequency has a correspondence with the first frequency, and the state information is used to indicate the first frequency, the first periodic time period, and a relationship between the second time period and the first time period. Multiple implementation manners of the state information improve function expansion of the wireless access device, and further improve practicability of the wireless access device.

In this embodiment, the processor 114 executes related operations to acquire state information of a first wireless access point and send the state information of the first wireless access point to user equipment, so that the first wireless access point sends a wireless access point identity on a radio resource corresponding to a sending pattern, so that the user equipment directly sends an activation signal to the first wireless access point identified by the wireless access point identity, so that the first wireless access point directly receives, on a radio resource corresponding to a receiving pattern, the activation signal sent by the user equipment, and leaves a power-saving state according to the activation signal. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the wireless access point identity is at least one of a physical cell identity, a physical cell group identity, a sounding reference signal, a synchronization signal, and a channel status indication reference signal.

Optionally, in this embodiment, the radio resource corresponding to the transmitting pattern is one or a combination of the following:

some frequencies in all frequencies supported by the first wireless access point;

some subframes in all subframes; and some code resources in all code resources supported by the first wireless access point.

Multiple implementation manners of the receiving pattern improve function expansion of the wireless access device, and further improve practicability of the wireless access device.

Optionally, in this embodiment, the sending pattern and/or the receiving pattern is prestored, or the sending pattern and/or the receiving pattern is configured by a second wireless access point, or the sending pattern and/or the receiving pattern is acquired from a network management device. For details of the specific configuration manner or acquisition manner, reference may be made to the description of the method embodiments, which are not described again herein.

Optionally, in this embodiment, the state information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

Figure 12:
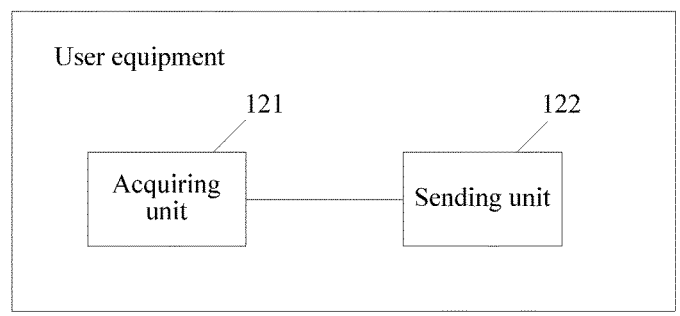
FIG. 12 is a structural diagram of user equipment according to an embodiment of the present invention.

Referring to FIG. 12, FIG. 12 is a structural diagram of user equipment according to an embodiment of the present invention. As shown in FIG. 12, the user equipment provided by this embodiment includes an acquiring unit 121 and a sending unit 122.

The acquiring unit 121 is configured to determine a receiving pattern that is used when a first wireless access point receives a signal in a power-saving state, where the power-saving state includes at least a power-saving receiving state, where the power-saving receiving state is that the first wireless access point receives the signal on a radio resource corresponding to the receiving pattern, and the radio resource corresponding to the receiving pattern is a part of all radio resources supported by the first wireless access point.

The sending unit 122 is configured to send an activation signal on the radio resource corresponding to the receiving pattern, where the activation signal is used to instruct the first wireless access point to leave the power-saving state.

In this embodiment, the acquiring unit 121 determines a receiving pattern that is used when a first wireless access point receives a signal in a power-saving state, so that the sending unit 122 sends an activation signal on a radio resource corresponding to the receiving pattern, so as to instruct the first wireless access point to leave a power-saving state. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, the acquiring unit in this embodiment is specifically configured to receive configuration information sent by a second wireless access point, where the configuration information includes state information used to indicate the receiving pattern of the first wireless access point; and configured to determine the receiving pattern of the first wireless access point according to the configuration information.

Optionally, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

Optionally, in another embodiment, the acquiring unit is specifically configured to receive a wireless access point identity that is sent by the first wireless access point in a power-saving transmitting state included by the power-saving state, where the wireless access point identity is used to identify the first wireless access point, the power-saving transmitting state is that the first wireless access point sends a signal on a radio resource corresponding to a sending pattern, and the radio resource corresponding to the sending pattern is a part of all radio resources supported by the first wireless access point.

The acquiring unit is further configured to determine, according to the wireless access point identity, the receiving pattern that is used when the first wireless access point receives the signal in the power-saving state.

Optionally, the acquiring unit is further configured to receive configuration information sent by a second wireless access point, where the configuration information includes state information used to indicate the sending pattern of the first wireless access point.

The acquiring unit is further configured to receive, according to the transmitting pattern, the wireless access point identity that is sent by the first wireless access point in the power-saving transmitting state included by the power-saving state.

Optionally, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

Optionally, the acquiring unit is further configured to obtain, according to a time point of receiving the wireless access point identity, and a correspondence between the sending pattern and the receiving pattern of the first wireless access point, a time point of sending the activation signal.

The sending unit is further configured to send the activation signal at the time point of sending the activation signal, where the correspondence between the sending pattern and the receiving pattern is prestored or is notified by the second wireless access point.

Optionally, the wireless access point identity is at least one of a physical cell identity, a physical cell group identity, a sounding reference signal, a synchronization signal, and a channel status indication reference signal.

Optionally, the configuration information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

Optionally, the user equipment further includes a receiving unit, configured to receive a notification that is sent by the first wireless access point and indicates that the first wireless access point leaves the power-saving state, where the notification indicating that the first wireless access point leaves the power-saving state includes at least one notification of a notification indicating that the first wireless access point leaves the power-saving receiving state or a notification indicating that the first wireless access point leaves the power-saving transmitting state.

Figure 13:
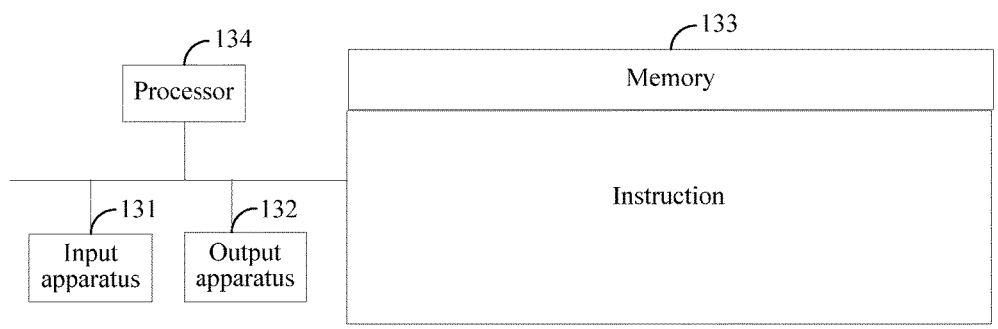
FIG. 13 is a structural diagram of another user equipment according to an embodiment of the present invention.

Referring to FIG. 13, FIG. 13 is a structural diagram of another user equipment according to an embodiment of the present invention. As shown in FIG. 13, the user equipment provided by this embodiment includes an input apparatus 131, an output apparatus 132, a memory 133, and a processor 134, where the memory 133 stores a set of program code, and the processor 134 is configured to invoke the program code stored in the memory 133 to execute the following operations:

determining a receiving pattern that is used when a first wireless access point receives a signal in a power-saving state, where the power-saving state includes at least a power-saving receiving state, where the power-saving receiving state is that the first wireless access point receives the signal on a radio resource corresponding to the receiving pattern, and the radio resource corresponding to the receiving pattern is a part of all radio resources supported by the first wireless access point; and sending an activation signal on the radio resource corresponding to the receiving pattern, where the activation signal is used to instruct the first wireless access point to leave the power-saving state.

In this embodiment, the processor 134 executes related operations to specifically determine a receiving pattern that is used when a first wireless access point receives a signal in a power-saving state and send an activation signal on the radio resource corresponding to the receiving pattern, so as to instruct the first wireless access point to leave the power-saving state. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the executing, by the processor, the operation of determining a receiving pattern that is used when a first wireless access point receives a signal in a power-saving state, includes:

receiving configuration information sent by a second wireless access point, where the configuration information includes state information used to indicate the receiving pattern of the first wireless access point; and determining the receiving pattern of the first wireless access point according to the configuration information.

Optionally, in this embodiment, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

Optionally, in another embodiment, the executing, by the processor, the operation of determining a receiving pattern that is used when a first wireless access point receives a signal in a power-saving state, includes:

receiving a wireless access point identity that is sent by the first wireless access point in a power-saving transmitting state included by the power-saving state, where the wireless access point identity is used to identify the first wireless access point, the power-saving transmitting state is that the first wireless access point sends a signal on a radio resource corresponding to a sending pattern, and the radio resource corresponding to the sending pattern is a part of all radio resources supported by the first wireless access point; and determining, according to the wireless access point identity, the receiving pattern that is used when the first wireless access point receives the signal in the power-saving state.

Optionally, before executing the operation of receiving a wireless access point identity, the processor is further configured to execute the following operation:

receiving configuration information sent by a second wireless access point, where the configuration information includes state information used to indicate the sending pattern of the first wireless access point; and the executing, by the processor, the operation of receiving a wireless access point identity that is sent by the first wireless access point in a power-saving transmitting state included by the power-saving state, includes:

receiving, according to the transmitting pattern, the wireless access point identity that is sent by the first wireless access point in the power-saving transmitting state included by the power-saving state.

Optionally, the configuration information further includes at least one piece of time synchronization information, power-saving state start indication information, and a cell identity, where the time synchronization information is used to indicate a relationship between time synchronization of the first wireless access point and time synchronization of the second wireless access point, the power-saving state start indication information is used to indicate whether the first wireless access point is in the power-saving receiving state, and the cell identity is used to identify a cell controlled by the first wireless access point.

Optionally, the executing, by the processor, the operation of determining, according to the wireless access point identity, the receiving pattern that is used when the first wireless access point receives the signal in the power-saving state, includes:

obtaining, according to a time point of receiving the wireless access point identity, and a correspondence between the sending pattern and the receiving pattern of the first wireless access point, a time point of sending the activation signal; and the sending an activation signal on the radio resource corresponding to the receiving pattern includes:

sending the activation signal at the time point of sending the activation signal, where the correspondence between the sending pattern and the receiving pattern is prestored or is notified by the second wireless access point.

Optionally, the wireless access point identity is at least one of a physical cell identity, a physical cell group identity, a sounding reference signal, a synchronization signal, and a channel status indication reference signal.

Optionally, the configuration information further includes indication information, where the indication information is used to indicate that the first wireless access point is in one of the following states:

the first wireless access point is in the power-saving receiving state;

the first wireless access point is in the power-saving transmitting state;

the first wireless access point is in the power-saving receiving state and a normal transmitting state;

the first wireless access point is in the power-saving transmitting state and the power-saving receiving state;

the first wireless access point is in a normal receiving state and the normal transmitting state;

the first wireless access point is in the normal receiving state and the power-saving transmitting state;

the first wireless access point is in the power-saving state; and the first wireless access point is in a non-power-saving state.

Optionally, in this embodiment, after the processor executes the operation of sending an activation signal on the radio resource corresponding to the receiving pattern, the processor is further configured to execute the following operation:

receiving a notification that is sent by the first wireless access point and indicates that the first wireless access point leaves the power-saving state, where the notification indicating that the first wireless access point leaves the power-saving state includes at least one notification of a notification indicating that the first wireless access point leaves the power-saving receiving state or a notification indicating that the first wireless access point leaves the power-saving transmitting state.

Figure 14:
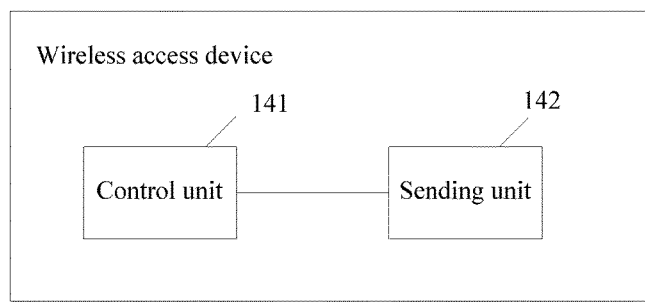
FIG. 14 is a structural diagram of another wireless access device according to the present application.

Referring to FIG. 14, FIG. 14 is a structural diagram of another wireless access device according to the present application. As shown in FIG. 14, the wireless access device provided by this embodiment includes a control unit 141 and a sending unit 142.

The control unit 141 is configured to control a first wireless access point to enter a power-saving state, where the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

The sending unit 142 is configured to send first information to user equipment, so that the user equipment sends an activation signal to the first wireless access point according to the first information to activate the first wireless access point, where the first information is used to indicate that the first wireless access point enters the power-saving state.

Alternatively, the sending unit 142 is configured to send second information to a second wireless access point, so that the second wireless access point sends the second information to the user equipment, so that the user equipment sends an activation signal to the first wireless access point according to the second information to activate the first wireless access point, where the second information is used to indicate that the first wireless access point enters the power-saving state.

The control unit 141 is further configured to control the first wireless access point to leave the power-saving state after the activation signal is received.

In this embodiment, the control unit 141 controls a first wireless access point to enter a power-saving state, and further the sending unit 142 sends first information to user equipment, so that the user equipment sends an activation signal to the first wireless access point according to the first information to directly activate the first wireless access point, where the first information is used to indicate that the first wireless access point enters the power-saving state; or the sending unit 142 sends second information to a second wireless access point, so that the second wireless access point sends the second information to the user equipment, so that the user equipment sends an activation signal to the first wireless access point according to the second information to directly activate the first wireless access point, where the second information is used to indicate that the first wireless access point enters the power-saving state; and further the control unit 141 controls the first wireless access point to leave the power-saving state after the activation signal is received. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Figure 15:
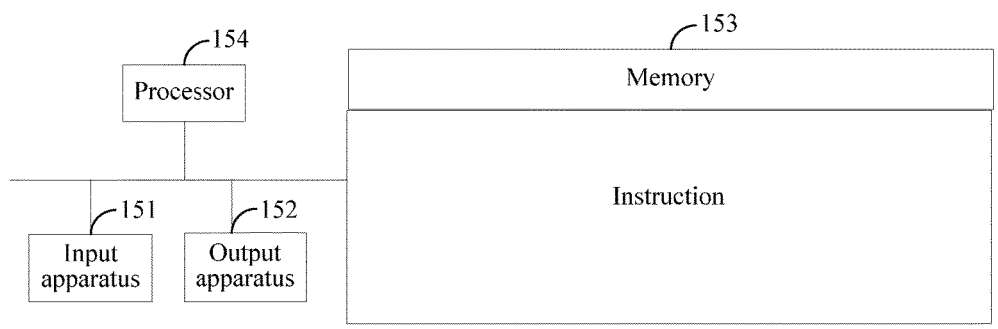
FIG. 15 is a structural diagram of another wireless access device according to the present application.

Referring to FIG. 15, FIG. 15 is a structural diagram of another wireless access device according to the present application. As shown in FIG. 15, the wireless access device provided by this embodiment includes an input apparatus 151, an output apparatus 152, a memory 153, and a processor 154, where the memory 153 stores a set of program code, and the processor 154 is configured to invoke the program code stored in the memory 152 to execute the following operations:

controlling a first wireless access point to enter a power-saving state, where the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point;

sending first information to user equipment, so that the user equipment sends an activation signal to the first wireless access point according to the first information to activate the first wireless access point, where the first information is used to indicate that the first wireless access point enters the power-saving state; or sending second information to a second wireless access point, so that the second wireless access point sends the second information to the user equipment, so that the user equipment sends an activation signal to the first wireless access point according to the second information to activate the first wireless access point, where the second information is used to indicate that the first wireless access point enters the power-saving state; and controlling the first wireless access point to leave the power-saving state after the activation signal is received.

In this embodiment, the processor 154 executes related operations to specifically control a first wireless access point to enter a power-saving state and send first information to user equipment, so that the user equipment sends an activation signal to the first wireless access point according to the first information to activate the first wireless access point, where the first information is used to indicate that the first wireless access point enters the power-saving state; or send second information to a second wireless access point, so that the second wireless access point sends the second information to the user equipment, so that the user equipment sends an activation signal to the first wireless access point according to the second information to activate the first wireless access point, where the second information is used to indicate that the first wireless access point enters the power-saving state. Finally, the first wireless access point leaves the power-saving state after receiving the activation signal. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Figure 16:
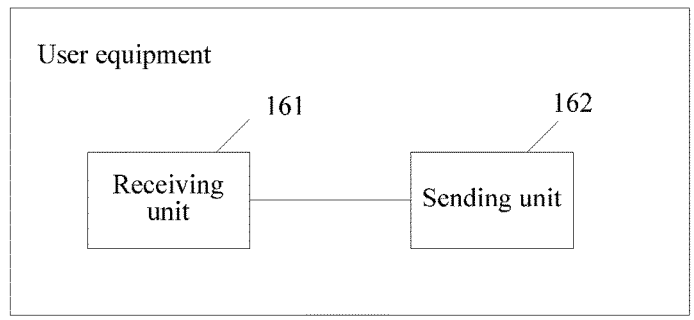
FIG. 16 is a structural diagram of another user equipment according to an embodiment of the present invention.

Referring to FIG. 16, FIG. 16 is a structural diagram of another user equipment according to an embodiment of the present invention. As shown in FIG. 16, the user equipment provided by this embodiment includes a receiving unit 161 and a sending unit 162.

The receiving unit 161 is configured to receive first information sent by a first wireless access point.

The sending unit 162 is configured to send an activation signal to the first wireless access point according to the first information to activate the first wireless access point, so that the first wireless access point leaves a power-saving state.

The first information is used to indicate that the first wireless access point enters the power-saving state.

The power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

In the user equipment provided by this embodiment, the receiving unit 161 receives first information sent by a first wireless access point, and the sending unit 162 sends an activation signal to the first wireless access point according to the first information to directly activate the first wireless access point, so that the first wireless access point leaves a power-saving state. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Figure 17:
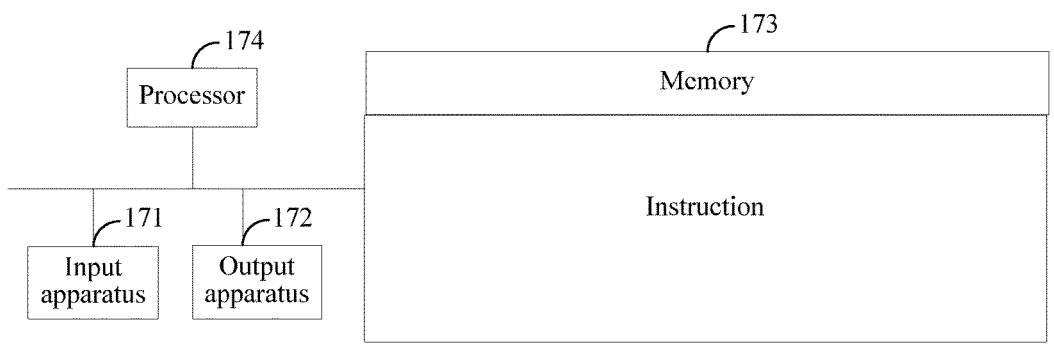
FIG. 17 is a structural diagram of another user equipment according to an embodiment of the present invention.

Referring to FIG. 17, FIG. 17 is a structural diagram of another user equipment according to an embodiment of the present invention. As shown in FIG. 17, the user equipment provided by this embodiment includes an input apparatus 171, an output apparatus 172, a memory 173, and a processor 174, where the memory 173 stores a set of program code, and the processor 174 is configured to invoke the program code stored in the memory 173 to execute the following operations:

receiving first information sent by a first wireless access point, so as to send an activation signal to the first wireless access point according to the first information to activate the first wireless access point, so that the first wireless access point leaves a power-saving state, where the first information is used to indicate that the first wireless access point enters the power-saving state; and the power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

In this embodiment, the processor 174 executes related operations to specifically receive first information sent by a first wireless access point, so as to directly send an activation signal to the first wireless access point according to the first information to directly activate the first wireless access point, so that the first wireless access point leaves a power-saving state. In this manner, a power-saving objective of the first wireless access point is achieved, and switching of the first wireless access point from the power-saving state to a normal communication state as soon as possible can also be accelerated on a basis of achieving power saving of the first wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Figure 18:
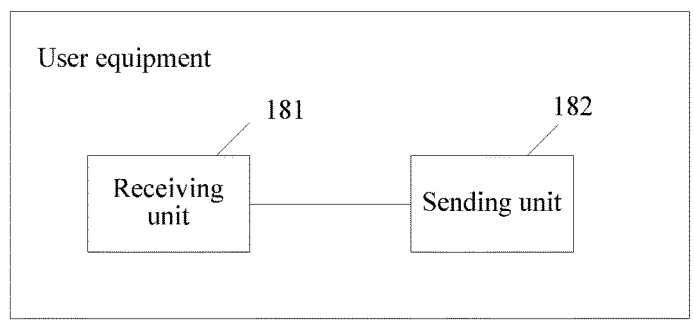
FIG. 18 is a structural diagram of another user equipment according to an embodiment of the present invention.

Referring to FIG. 18, FIG. 18 is a structural diagram of another user equipment according to an embodiment of the present invention. As shown in FIG. 18, the user equipment provided by this embodiment includes a receiving unit 181 and a sending unit 182.

The receiving unit 181 is configured to receive indication information sent by a first wireless access point.

The sending unit 182 is configured to send an activation signal to a second wireless access point according to the indication information to activate the second wireless access point, so that the second wireless access point leaves a power-saving state.

The indication information sent by the first wireless access point is indication information sent by the second wireless access point and received by the first wireless access point, where the indication information is used to indicate that the second wireless access point enters the power-saving state.

The power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

In this embodiment, the receiving unit 181 receives indication information sent by a first wireless access point, so that the sending unit 182 directly sends an activation signal to a second wireless access point according to the indication information to directly activate the second wireless access point, so that the second wireless access point leaves a power-saving state. In this manner, a power-saving objective of the second wireless access point is achieved, and switching of the second wireless access point from the power-saving state to a normal communication state as soon as possible can also be accelerated on a basis of achieving power saving of the second wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Figure 19:
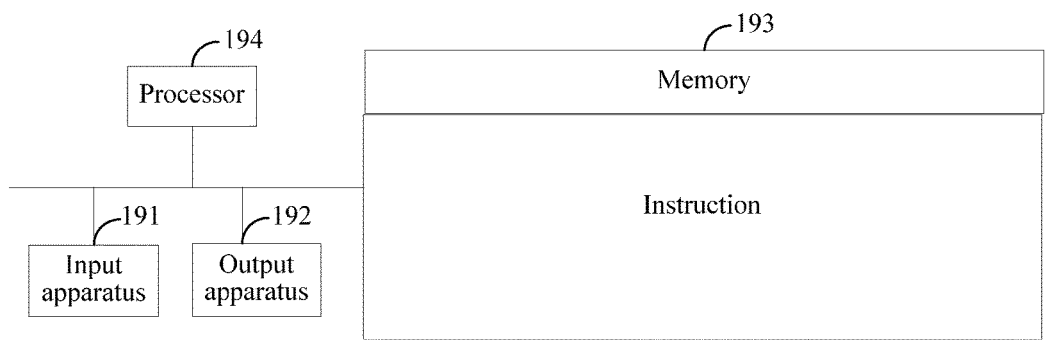
FIG. 19 is a structural diagram of another user equipment according to an embodiment of the present invention.

Referring to FIG. 19, FIG. 19 is a structural diagram of another user equipment according to an embodiment of the present invention. As shown in FIG. 19, the user equipment provided by this embodiment includes an input apparatus 191, an output apparatus 192, a memory 193, and a processor 194, where the memory 193 stores a set of program code, and the processor 194 is configured to invoke the program code stored in the memory 193 to execute the following operations:

receiving indication information sent by a first wireless access point, so as to send an activation signal to a second wireless access point according to the indication information to activate the second wireless access point, so that the second wireless access point leaves a power-saving state.

The indication information sent by the first wireless access point is indication information sent by the second wireless access point and received by the first wireless access point, where the indication information is used to indicate that the second wireless access point enters the power-saving state.

The power-saving state includes at least one state of a power-saving transmitting state or a power-saving receiving state, where the power-saving receiving state is that the first wireless access point receives a signal on a radio resource corresponding to a receiving pattern, and the radio resource corresponding to the receiving pattern is a part of all radio resources supported by the first wireless access point; and the power-saving transmitting state is that the first wireless access point sends a signal on a radio resource corresponding to a sending pattern, and the radio resource corresponding to the sending pattern is a part of all radio resources supported by the first wireless access point.

In this embodiment, the processor 194 executes related operations to specifically receive indication information sent by a first wireless access point, so as to send an activation signal to a second wireless access point according to the indication information to activate the second wireless access point, so that the second wireless access point leaves a power-saving state. In this manner, a power-saving objective of the second wireless access point is achieved, and switching of the second wireless access point from the power-saving state to a normal communication state as soon as possible can also be accelerated on a basis of achieving power saving of the second wireless access point.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Figure 20:
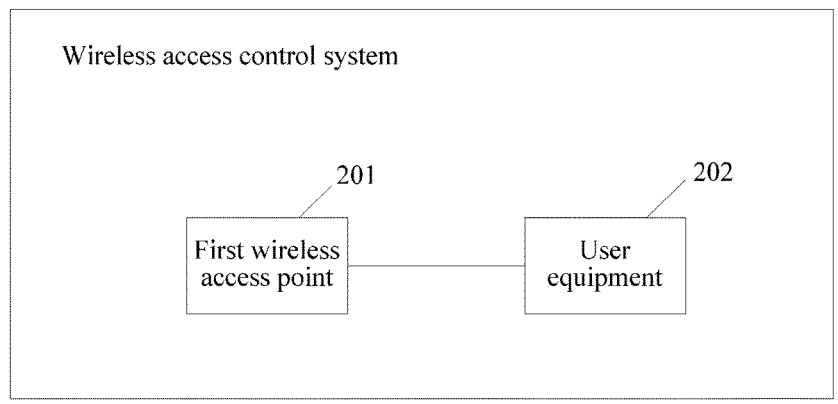
FIG. 20 is a structural diagram of wireless access control system according to an embodiment of the present invention.

Referring to FIG. 20, FIG. 20 is a structural diagram of a wireless access control system according to an embodiment of the present invention. As shown in FIG. 20, the wireless access control system provided by this embodiment includes a first wireless access point 201 and user equipment 202. The first wireless access point 201 enters a power-saving state, where the power-saving state includes at least a power-saving receiving state, where the power-saving receiving state is that the first wireless access point 201 receives a signal on a radio resource corresponding to a receiving pattern, and the radio resource corresponding to the receiving pattern is a part of all radio resources supported by the first wireless access point 201.

The first wireless access point 201 is configured to receive, on the radio resource corresponding to the receiving pattern, an activation signal sent by the user equipment 202.

The first wireless access point 201 is further configured to leave the power-saving state according to the activation signal.

In this embodiment, the first wireless access point 201 directly receives, on a radio resource corresponding to a receiving pattern, an activation signal sent by the user equipment 202, and further the first wireless access point 201 leaves a power-saving state directly according to the activation signal sent by the user equipment 202. In this manner, a power-saving objective of the first wireless access point 201 is achieved, and switching of the first wireless access point 201 from the power-saving state to a normal communication state as soon as possible can also be accelerated on a basis of achieving power saving of the first wireless access point 201.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

Figure 21:
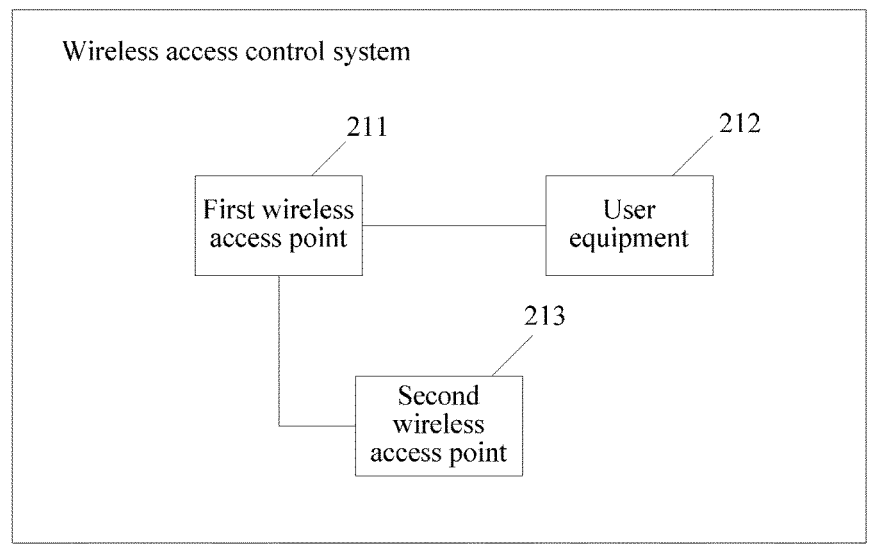
FIG. 21 is a structural diagram of wireless access control system according to an embodiment of the present invention.

Referring to FIG. 21, FIG. 21 is a structural diagram of another wireless access control system according to an embodiment of the present invention. As shown in FIG. 21, the wireless access control system provided by this embodiment includes a first wireless access point 211, user equipment 212, and a second wireless access point 213. The first wireless access point 211 enters a power-saving state, where the power-saving state includes at least a power-saving receiving state, where the power-saving receiving state is that the first wireless access point 211 receives a signal on a radio resource corresponding to a receiving pattern, and the radio resource corresponding to the receiving pattern is a part of all radio resources supported by the first wireless access point 211.

The second wireless access point 213 is configured to receive state information sent by the first wireless access point 211, so as to send the state information to the user equipment 212 served by the second wireless access point 213, where the state information is used to indicate the radio resource corresponding to the receiving pattern.

The first wireless access point 211 is configured to receive, on the radio resource corresponding to the receiving pattern, an activation signal sent by the user equipment 212.

The first wireless access point 211 is further configured to leave the power-saving state according to the activation signal.

In this embodiment, the second wireless access point 213 receives state information sent by the first wireless access point 211, so as to send the state information to the user equipment 212 served by the second wireless access point 213, so that the first wireless access point 211 directly receives, on a radio resource corresponding to a receiving pattern, an activation signal sent by the user equipment 212, so that the first wireless access point 211 leaves a power-saving state according to the activation signal. In this manner, a power-saving objective of the first wireless access point 211 is achieved, and switching of the first wireless access point 211 from the power-saving state to a normal communication state as soon as possible can also be accelerated on a basis of achieving power saving of the first wireless access point 211.

Further, radio resources corresponding to different power-saving receiving patterns or power-saving transmitting patterns are set, to achieve a function of diversification of power-saving modes of a wireless access point, which can adapt to multiple environments in which a wireless access point is applied.

Optionally, in this embodiment, the radio resource corresponding to the receiving pattern is one or a combination of the following:

some frequencies in all frequencies supported by the first wireless access point;

some subframes in all subframes; and some code resources in all code resources supported by the first wireless access point.

In the several embodiments provided in the present application, it should be understood that the disclosed device and method may be implemented in other manners. For example, the described device embodiment is merely exemplary. For example, the module or unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented by using some interfaces. The indirect couplings or communication connections between the apparatuses, modules, or units may be implemented in electronic, mechanical, or other forms.

The modules or units described as separate parts may or may not be physically separate, and parts displayed as modules or units may or may not be physical modules or units, may be located in one position, or may be distributed on a plurality of network modules or units. Some or all of the modules or units may be selected according to actual needs to achieve the objectives of the solutions of the embodiments.

In addition, functional modules or units in the embodiments of the present invention may be integrated into one processing module or unit, or each of the modules or units may exist alone physically, or two or more modules or units are integrated into one module or unit. The integrated modules or units may be implemented in a form of hardware, or may be implemented in a form of a software functional unit.

When the integrated module or unit is implemented in the form of a software functional module or unit and sold or used as an independent product, the integrated module or unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless access point control method, comprising:
   entering, by a first wireless access point, a power-saving state, wherein the power-saving state comprises at least a power-saving receiving state, wherein, in the power-saving receiving state, the first wireless access point receives a signal on a radio resource corresponding to a receiving pattern, and wherein the radio resource corresponding to the receiving pattern is a part of a plurality of radio resources supported by the first wireless access point;
   sending, by the first wireless access point and in the power-saving state, a wireless access point identity on a radio resource corresponding to a sending pattern, wherein the wireless access point identity identifies the first wireless access point;
   receiving, by the first wireless access point, on the radio resource corresponding to the receiving pattern, and in response to the sending the wireless point identity, an activation signal sent by user equipment; and
   leaving, by the first wireless access point, the power-saving state according to the activation signal.

2. The wireless access point control method according to claim 1, wherein the method further comprises:
   sending, by the first wireless access point and before the receiving the activation signal sent by the user equipment, state information to a second wireless access point, causing the second wireless access point to send the state information to the user equipment served by the second wireless access point, wherein the state information indicates the radio resource corresponding to the receiving pattern.

3. The wireless access point control method according to claim 1, wherein the power-saving state further comprises a power-saving transmitting state, wherein, in the power-saving transmitting state, the first wireless access point sends a signal on a radio resource corresponding to the sending pattern, and wherein the radio resource corresponding to the sending pattern is a part of the plurality of the radio resources supported by the first wireless access point.

4. The wireless access point control method according to claim 3, wherein the method further comprises sending, by the first wireless access point and before the sending the wireless access point identity on the radio resource corresponding to the sending pattern, state information to a second wireless access point, causing the second wireless access point to send the state information to the user equipment served by the second wireless access point;
   wherein the state information indicates the radio resource corresponding to the sending pattern and the radio resource corresponding to the receiving pattern; or
   the sending pattern has a correspondence with the receiving pattern, and the state information indicates the radio resource corresponding to the sending pattern or the radio resource corresponding to the receiving pattern; or
   the radio resource corresponding to the sending pattern is a first periodic time period on a first frequency, and the radio resource corresponding to the receiving pattern is a second periodic time period on a second frequency, wherein the second frequency has a correspondence with the first frequency, and the state information indicates the first frequency, the first periodic time period, and a relationship between the second periodic time period and the first periodic time period.

5. A wireless access point control method, comprising:
   receiving, by user equipment, a wireless access point identity that is sent by a first wireless access point in a power-saving transmitting state comprised by a power-saving state, wherein the wireless access point identity identifies the first wireless access point, wherein, in the power-saving transmitting state, the first wireless access point sends a signal on a radio resource corresponding to a sending pattern, and wherein the radio resource corresponding to the sending pattern is a part of a plurality of radio resources supported by the first wireless access point;
   determining, by the user equipment, a receiving pattern that is used when the first wireless access point receives a signal in a power-saving state, wherein the power-saving state comprises at least a power-saving receiving state, wherein, in the power-saving receiving state, the first wireless access point receives the signal on a radio resource corresponding to the receiving pattern, and wherein the radio resource corresponding to the receiving pattern is a part of the plurality of the radio resources supported by the first wireless access point; and
   sending, by the user equipment, an activation signal on the radio resource corresponding to the receiving pattern, wherein the activation signal instructs the first wireless access point to leave the power-saving state.

6. The wireless access point control method according to claim 5, wherein the determining the receiving pattern comprises:
   receiving configuration information sent by a second wireless access point, wherein the configuration information comprises state information indicative of the receiving pattern of the first wireless access point; and
   determining the receiving pattern of the first wireless access point according to the configuration information.

7. The wireless access point control method according to claim 5, wherein the determining the receiving pattern comprises:
   determining, by the user equipment and according to the wireless access point identity, the receiving pattern that is used when the first wireless access point receives the signal in the power-saving state.

8. The wireless access point control method according to claim 7, wherein the method further comprises:
   receiving, by the user equipment and before the receiving a wireless access point identity, configuration information sent by a second wireless access point, wherein the configuration information comprises state information indicative of the sending pattern of the first wireless access point; and
   wherein the receiving, by the user equipment, a wireless access point identity that is sent by the first wireless access point in a power-saving transmitting state comprised by the power-saving state, comprises:
   receiving, by the user equipment according to the receiving pattern and before the receiving a wireless access point identity, the wireless access point identity that is sent by the first wireless access point in the power-saving transmitting state comprised by the power-saving state.

9. The wireless access point control method according to claim 7, wherein the determining, the receiving pattern that is used when the first wireless access point receives the signal in the power-saving state, comprises:
obtaining, by the user equipment according to a time point of receiving the wireless access point identity and a correspondence between the sending pattern and the receiving pattern of the first wireless access point, a time point of sending the activation signal;
wherein the sending an activation signal on the radio resource corresponding to the receiving pattern, comprises sending, by the user equipment, the activation signal at the time point of sending the activation signal; and
wherein the correspondence between the sending pattern and the receiving pattern is prestored or is notified by a second wireless access point.

10. A wireless access point control method, comprising:
acquiring state information of a first wireless access point, wherein the state information indicates a radio resource corresponding to a receiving pattern, wherein the first wireless access point that transmits the state information is in a power-saving state; and
sending the state information of the first wireless access point to user equipment, causing the first wireless access point to receive, on the radio resource corresponding to the receiving pattern, an activation signal that is sent by the user equipment according to the state information and that is further sent in response to the user equipment receiving a wireless access point identity sent by the first wireless access point on a radio resource corresponding to a sending pattern and while the first wireless access point is in the power-saving state, and further causing the first wireless access point to leave the power-saving state in response to the first wireless access point receiving the activation signal and further according to the activation signal;
wherein the power-saving state comprises a power-saving receiving state;
wherein, in the power-saving receiving state, the first wireless access point receives a signal on the radio resource corresponding to the receiving pattern; and
wherein the radio resource corresponding to the receiving pattern is a part of a plurality of radio resources supported by the first wireless access point.

11. A wireless access point control method, comprising:
acquiring state information of a first wireless access point; and
sending the state information of the first wireless access point to user equipment, causing the first wireless access point to send a wireless access point identity on a radio resource corresponding to a sending pattern, and causing the user equipment to send an activation signal to the first wireless access point identified by the wireless access point identity, further causing the first wireless access point to receive, on a radio resource corresponding to a receiving pattern, the activation signal sent by the user equipment, and to leave a power-saving state according to the activation signal;
wherein the wireless access point identity identifies the first wireless access point, and the power-saving state comprises a power-saving receiving state and a power-saving transmitting state;
wherein, in the power-saving receiving state, the first wireless access point receives a signal on the radio resource corresponding to the receiving pattern, the radio resource corresponding to the receiving pattern is a part of a plurality of radio resources supported by the first wireless access point;
wherein, in the power-saving transmitting state, the first wireless access point sends a signal on the radio resource corresponding to the sending pattern, the radio resource corresponding to the sending pattern is a part of the plurality of the radio resources supported by the first wireless access point; and
wherein the state information indicates the radio resource corresponding to the sending pattern and the radio resource corresponding to the receiving pattern; or
the sending pattern has a correspondence with the receiving pattern, and the state information indicates the radio resource corresponding to the sending pattern or the radio resource corresponding to the receiving pattern; or
the radio resource corresponding to the sending pattern is a first periodic time period on a first frequency, and the radio resource corresponding to the receiving pattern is a second periodic time period on a second frequency, wherein the second frequency has a correspondence with the first frequency, and the state information indicates the first frequency, the first periodic time period, and a relationship between the second periodic time period and the first periodic time period.

12. A wireless access point control method, comprising:
entering, by a first wireless access point, a power-saving state, wherein the power-saving state comprises at least one state of a power-saving transmitting state or a power-saving receiving state, wherein, in the power-saving receiving state, the first wireless access point receives a signal on a radio resource corresponding to a receiving pattern, and the radio resource corresponding to the receiving pattern is a part of a plurality of radio resources supported by the first wireless access point, wherein, in the power-saving transmitting state, the first wireless access point sends a signal on a radio resource corresponding to a sending pattern, and the radio resource corresponding to the sending pattern is a part of the plurality of the radio resources supported by the first wireless access point;
performing at least one of:
sending, by the first wireless access point in the power-saving state, first information to user equipment, causing the user equipment to send an activation signal to the first wireless access point according to the first information to activate the first wireless access point, wherein the first information indicates that the first wireless access point enters the power-saving state, and wherein the first information includes a wireless access point identity that identifies the first wireless access point; or
sending, by the first wireless access point in the power-saving state, second information to a second wireless access point, causing the second wireless access point to send the second information to the user equipment, causing the user equipment to send an activation signal to the first wireless access point according to the second information to activate the first wireless access point, wherein the second information indicates that the first wireless access point enters the power-saving state, and wherein the first information includes the wireless access point identity that identifies the first wireless access point; and
leaving, by the first wireless access point, the power-saving state after receiving the activation signal.

13. A wireless access point control method, comprising:
receiving indication information sent by a first wireless access point, and sending an activation signal to a second wireless access point according to the indication information to activate the second wireless access point, the indication information causing the second wireless access point to leave a power-saving state;
wherein the indication information sent by the first wireless access point is indication information sent by the second wireless access point and received by the first wireless access point, wherein the indication information indicates that the second wireless access point enters the power-saving state, and wherein the indication information includes a wireless access point identity that identifies the first wireless access point;
wherein the power-saving state comprises at least one state of a power-saving transmitting state or a power-saving receiving state, wherein, in the power-saving receiving state, the first wireless access point receives a signal on a radio resource corresponding to a receiving pattern, and the radio resource corresponding to the receiving pattern is a part of a plurality of radio resources supported by the first wireless access point; and
wherein, in the power-saving transmitting state, the first wireless access point sends a signal on a radio resource corresponding to a sending pattern, and the radio resource corresponding to the sending pattern is at least a portion of the plurality of radio resources supported by the first wireless access point.

14. A wireless access device, comprising:
an input apparatus;
an output apparatus;
a processor; and
a non-transitory computer readable medium connected to the processor and having stored thereon a set of program code that, when invoked, causes the processor to execute the following operations:
controlling a first wireless access point to enter a power-saving state, wherein the power-saving state comprises at least a power-saving receiving state, wherein, in the power-saving receiving state, the first wireless access point receives a signal on a radio resource corresponding to a receiving pattern, and the radio resource corresponding to the receiving pattern is a part of the plurality of the radio resources supported by the first wireless access point, and wherein the power-saving state further comprises a power-saving transmitting state, wherein, in the power-saving transmitting state, the first wireless access point sends a signal on a radio resource corresponding to a sending pattern;
sending, in the power-saving state, a wireless access point identity on the radio resource corresponding to the sending pattern, wherein the wireless access point identity identifies the first wireless access point;
receiving, on the radio resource corresponding to the receiving pattern and in response to the sending the wireless access point identity, an activation signal sent by user equipment; and
controlling the first wireless access point to leave the power-saving state according to the activation signal.

15. The wireless access device according to claim 14, wherein the non-transitory computer readable medium further has stored thereon program code that, when invoked, causes the processor to execute the following operation:
sending state information to a second wireless access point before the receiving the activation signal sent by the user equipment, causing the second wireless access point to send the state information to the user equipment served by the second wireless access point; and
wherein the state information indicates the radio resource corresponding to the receiving pattern.

16. The wireless access device according to claim 14, wherein the radio resource corresponding to the sending pattern is a part of all radio resources supported by the first wireless access point.

17. The wireless access device according to claim 16, wherein the non-transitory computer readable medium further has stored thereon program code that, when invoked, causes the processor to execute the sending, before the sending the wireless access point identity on the radio resource corresponding to the sending pattern, state information to a second wireless access point, causing the second wireless access point to send the state information to the user equipment served by the second wireless access point;
wherein the state information indicates the radio resource corresponding to the sending pattern and the radio resource corresponding to the receiving pattern; or
the sending pattern has a correspondence with the receiving pattern, and the state information indicates the radio resource corresponding to the sending pattern or the radio resource corresponding to the receiving pattern; or
the radio resource corresponding to the sending pattern is a first periodic time period on a first frequency, and the radio resource corresponding to the receiving pattern is a second periodic time period on a second frequency, wherein the second frequency has a correspondence with the first frequency, and the state information indicates the first frequency, the first periodic time period, and a relationship between the second periodic time period and the first periodic time period.

18. User equipment, comprising:
an input apparatus;
an output apparatus;
a processor; and
a non-transitory computer readable medium connected to the processor and having stored thereon a set of program code that, when invoked, causes the processor to execute the following operations:
receiving a wireless access point identity that is sent by a first wireless access point in a power-saving transmitting state comprised by a power-saving state, wherein the wireless access point identity identifies the first wireless access point, wherein, in the power-saving transmitting state, the first wireless access point sends a signal on a radio resource corresponding to a sending pattern, and wherein the radio resource corresponding to the sending pattern is a part of a plurality of the radio resources supported by the first wireless access point;
determining a receiving pattern that is used when the first wireless access point receives a signal in a power-saving state, wherein the power-saving state comprises at least a power-saving receiving state, wherein, in the power-saving receiving state, the first wireless access point receives the signal on a radio resource corresponding to the receiving pattern, and wherein the radio resource corresponding to the receiving pattern is a part of the plurality of the radio resources supported by the first wireless access point; and sending an activation signal on the radio resource corresponding to the receiving pattern, wherein the activation signal instructs the first wireless access point to leave the power-saving state.

19. The user equipment according to claim 18, wherein the executing, by the processor, the determining the receiving pattern comprises:

receiving configuration information sent by a second wireless access point, wherein the configuration information comprises state information indicative of the receiving pattern of the first wireless access point; and determining the receiving pattern of the first wireless access point according to the configuration information.

20. The user equipment according to claim 18, wherein the executing, by the processor, the determining the receiving pattern comprises:

determining, according to the wireless access point identity, the receiving pattern that is used when the first wireless access point receives the signal in the power-saving state.

21. The user equipment according to claim 20, wherein the non-transitory computer readable medium further has stored thereon program code that, when invoiced, causes the processor to execute the receiving, before the receiving the wireless access point identity, configuration information sent by a second wireless access point, wherein the configuration information comprises state information indicative of the sending pattern of the first wireless access point; and wherein the executing, by the processor, the receiving the wireless access point identity comprises:

receiving, according to the sending pattern, the wireless access point identity that is sent by the first wireless access point in the power-saving transmitting state comprised by the power-saving state.

22. The user equipment according to claim 20, wherein the executing, by the processor, the determining the receiving pattern comprises:

obtaining, according to a time point of receiving the wireless access point identity, and a correspondence between the sending pattern and the receiving pattern of the first wireless access point, a time point of sending the activation signal; and wherein the sending an activation signal on the radio resource corresponding to the receiving pattern comprises:

sending the activation signal at the time point of sending the activation signal; and wherein the correspondence between the sending pattern and the receiving pattern is prestored or is notified by a second wireless access point.

23. A wireless access device, comprising:
an input apparatus;
an output apparatus;
a processor; and
a non-transitory computer readable medium connected to the processor and having stored thereon a set of program code that, when invoked, causes the processor to execute the following operations:

acquiring state information of a first wireless access point, wherein the state information indicates a radio resource corresponding to a receiving pattern, wherein the first wireless access point that transmits the state information is in a power-saving state; and sending the state information of the first wireless access point to user equipment, causing the first wireless access point to receive, on the radio resource corresponding to the receiving pattern, an activation signal that is sent by the user equipment according to the state information and that is further sent in response to the user equipment receiving a wireless access point identity sent by the first wireless access point on a radio resource corresponding to a sending pattern and while the first wireless access point is in the power-saving state, and further causing the first wireless access point to leave the power-saving state in response to the first wireless access point receiving the activation signal and further according to the activation signal;

wherein the power-saving state comprises a power-saving receiving state;

wherein, in the power-saving receiving state, the first wireless access point receives a signal on the radio resource corresponding to the receiving pattern; and wherein the radio resource corresponding to the receiving pattern is a part of a plurality of radio resources supported by the first wireless access point.

24. A wireless access device, comprising:
an input apparatus;
an output apparatus;
a processor; and
a non-transitory computer readable medium connected to the processor and having stored thereon a set of program code that, when invoked, causes the processor to execute the following operations:

acquiring state information of a first wireless access point; and sending the state information of the first wireless access point to user equipment, causing the first wireless access point to send a wireless access point identity on a radio resource corresponding to a sending pattern, causing the user equipment to send an activation signal to the first wireless access point identified by the wireless access point identity, further causing the first wireless access point to receive, on a radio resource corresponding to a receiving pattern, the activation signal sent by the user equipment, and to leave a power-saving state according to the activation signal;

wherein the wireless access point identity identifies the first wireless access point;

wherein the power-saving state comprises a power-saving receiving state and a power-saving transmitting state;

wherein, in the power-saving receiving state, the first wireless access point receives a signal on the radio resource corresponding to the receiving pattern;

wherein the radio resource corresponding to the receiving pattern is a part of a plurality of radio resources supported by the first wireless access point;

wherein the power-saving transmitting state is that the first wireless access point sends a signal on the radio resource corresponding to the sending pattern;

wherein the radio resource corresponding to the sending pattern is a part of a plurality of radio resources supported by the first wireless access point; and wherein the state information indicates the radio resource corresponding to the sending pattern and the radio resource corresponding to the receiving pattern; or the sending pattern has a correspondence with the receiving pattern, and the state information indicates the radio resource corresponding to the sending pattern or the radio resource corresponding to the receiving pattern; or
the radio resource corresponding to the sending pattern is a first periodic time period on a first frequency, and the radio resource corresponding to the receiving pattern is a second periodic time period on a second frequency, wherein the second frequency has a correspondence with the first frequency, and the state information indicates the first frequency, the first periodic time period, and a relationship between the second periodic time period and the first periodic time period.

25. A wireless access device, comprising:
an input apparatus;
an output apparatus;
a processor; and
a non-transitory computer readable medium connected to the processor and having stored thereon a set of program code that, when invoked, causes the processor to execute the following operations:
controlling a first wireless access point to enter a power-saving state, wherein the power-saving state comprises at least one state of a power-saving transmitting state or a power-saving receiving state, wherein in the power-saving receiving state, the first wireless access point receives a signal on a radio resource corresponding to a receiving pattern, and the radio resource corresponding to the receiving pattern is a part of a plurality of radio resources supported by the first wireless access point, and wherein, in the power-saving transmitting state, the first wireless access point sends a signal on a radio resource corresponding to a sending pattern, and the radio resource corresponding to the sending pattern is a part of a plurality of radio resources supported by the first wireless access point;
performing at least one of:
sending first information to user equipment, causing the user equipment to send an activation signal to the first wireless access point according to the first information to activate the first wireless access point, wherein the first information indicates that the first wireless access point enters the power-saving state, and wherein the first information includes a wireless access point identity that identifies the first wireless access point; or
sending second information to a second wireless access point, causing the second wireless access point to send the second information to the user equipment, causing the user equipment to send an activation signal to the first wireless access point according to the second information to activate the first wireless access point, wherein the second information indicates that the first wireless access point enters the power-saving state, and wherein the first information includes the wireless access point identity that identifies the first wireless access point; and
controlling the first wireless access point to leave the power-saving state after the activation signal is received.

26. User equipment, comprising:
an input apparatus;
an output apparatus;
a processor; and
a non-transitory computer readable medium connected to the processor and having stored thereon a set of program code that, when invoked, causes the processor to execute the following operations:
receiving indication information sent by a first wireless access point, and sending an activation signal to a second wireless access point according to the indication information to activate the second wireless access point, causing the second wireless access point to leave a power-saving state;
wherein the indication information sent by the first wireless access point is indication information sent by the second wireless access point and received by the first wireless access point;
wherein the indication information indicates that the second wireless access point enters the power-saving state, and wherein the indication includes a wireless access point identity that identifies the first wireless access point;
wherein the power-saving state comprises at least one state of a power-saving transmitting state or a power-saving receiving state;
wherein, in the power-saving receiving state, the first wireless access point receives a signal on a radio resource corresponding to a receiving pattern, and the radio resource corresponding to the receiving pattern is a part of a plurality of radio resources supported by the first wireless access point; and
wherein, in the power-saving transmitting state, the first wireless access point sends a signal on a radio resource corresponding to a sending pattern, and the radio resource corresponding to the sending pattern is a part of a plurality of radio resources supported by the first wireless access point.

* * * * *

UNITED STATES PATENT AND TRADEMARK OFFICE
CERTIFICATE OF CORRECTION

PATENT NO. : 10,200,952 B2
APPLICATION NO. : 14/821255
DATED : February 5, 2019
INVENTOR(S) : Lin et al.

Page 1 of 1

It is certified that error appears in the above-identified patent and that said Letters Patent is hereby corrected as shown below:

In the Claims

In Column 86, Line 32, Claim 26, delete "the indication includes" and insert --the indication information includes--.

Signed and Sealed this
Second Day of April, 2019

Andrei Iancu
*Director of the United States Patent and Trademark Office*